United States Patent
Hasegawa

(10) Patent No.: US 12,346,256 B2
(45) Date of Patent: Jul. 1, 2025

(54) SEMICONDUCTOR DEVICE WITH HYPERVISOR-BASED CACHE MANAGEMENT FOR MULTI-PROCESSOR SYSTEM AND CONTROL METHOD FOR THE SAME

(71) Applicant: RENESAS ELECTRONICS CORPORATION, Tokyo (JP)

(72) Inventor: Masahiro Hasegawa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 547 days.

(21) Appl. No.: 17/748,725

(22) Filed: May 19, 2022

(65) Prior Publication Data

US 2023/0376334 A1    Nov. 23, 2023

(51) Int. Cl.
*G06F 12/0842* (2016.01)
*G06F 9/455* (2018.01)
*G06F 12/0802* (2016.01)

(52) U.S. Cl.
CPC ...... *G06F 12/0842* (2013.01); *G06F 12/0802* (2013.01); *G06F 9/45558* (2013.01); *G06F 2009/45583* (2013.01)

(58) Field of Classification Search
CPC ............. G06F 9/45558; G06F 12/0802; G06F 12/084; G06F 12/0842; G06F 12/0895; G06F 12/126; G06F 12/128; G06F 2009/45583

See application file for complete search history.

(56) References Cited

U.S. PATENT DOCUMENTS

| | | | |
|---|---|---|---|
| 2011/0010503 A1* | 1/2011 | Yamamura | G06F 12/121 711/128 |
| 2011/0055827 A1* | 3/2011 | Lin | G06F 12/121 711/129 |
| 2023/0289288 A1* | 9/2023 | Agarwal | G06F 12/0888 |

FOREIGN PATENT DOCUMENTS

JP    2009-015509 A    1/2009

* cited by examiner

*Primary Examiner* — Aracelis Ruiz
(74) *Attorney, Agent, or Firm* — Rimon P.C.

(57) ABSTRACT

A semiconductor device includes a plurality of processors capable of executing a plurality of virtual machines and a cache memory. Each of the plurality of virtual machines executes a different operating system from each other. A hypervisor sets allocation information so as to allocate ways of the cache memory which can be used by the virtual machine. When outputting a memory access request, each of the processors outputs virtual machine identification in association with the information memory access request. When the memory access request is not a cache hit, the cache memory selects a way to be replaced data based on the virtual machine identification information and the allocation information.

20 Claims, 23 Drawing Sheets

FIG. 4

| ID / WAY | 131 | 132 | 133 | 134 |
|---|---|---|---|---|
| HYID | X | X | X | X |

FIG. 5

| WAY ID | 131 | 132 | 133 | 134 |
|---|---|---|---|---|
| HYID | | | | |
| VMID1 | X | X | | |
| VMID2 | | | X | X |

FIG. 7

| ID \ WAY | 131 | 132 | 133 | 134 |
|---|---|---|---|---|
| HYID | | | | |
| VMID1 | X | X | X | |
| VMID2 | | X | X | X |

FIG. 12

| WAY ID | 131 | 132 | 133 | 134 |
|---|---|---|---|---|
| VMID1 | X | X | | |
| VMID2 | | | X | X |

FIG. 14

| ID | WAY | 131 | 132 | 133 | 134 |
|---|---|---|---|---|---|
| VMID1 | SWID1 | - | X | - | - |
| VMID1 | SWID2 | X | - | - | - |
| VMID2 | SWID1 | - | - | - | X |
| VMID2 | SWID2 | - | - | X | X |

AREA A (columns 131-132, VMID1 rows)
AREA B (columns 133-134, VMID2 rows)

FIG. 20

| OPERATION MODE / WAY | 131 | 132 | 133 | 134 |
|---|---|---|---|---|
| SECURE | | | | X |
| NON-SECURE | X | X | X | |

FIG. 21

| WAY ID | i31 | i32 | i33 | i34 |
|---|---|---|---|---|
| SMID | - | - | - | |
| SWID3 | - | - | - | X |
| HYID | X | | | |
| VMID1 | | X | | |
| VMID2 | | | X | |

AREA C (column i34, SWID3)

AREA D (columns i31–i34, rows HYID/VMID1/VMID2)

SEMICONDUCTOR DEVICE WITH HYPERVISOR-BASED CACHE MANAGEMENT FOR MULTI-PROCESSOR SYSTEM AND CONTROL METHOD FOR THE SAME

BACKGROUND

The present disclosure relates to a semiconductor device and a control method for the semiconductor device.

With the progress of autonomous driving, electrification, and connected technology, electric/electronic (E/E) architecture of automobiles is becoming more complex and advanced. In the E/E architecture of the automobiles, many electronic control units (ECUS) operate in complex coordination. A plurality of processors is mounted on a semiconductor device constituting the ECU, and a plurality of operating systems (OSs) operate. The semiconductor device includes a hardware resource such as a cache memory, and the plurality of OSs shares the hardware resource. Reducing the competition of the hardware resource by the plurality of OSs contributes to the stability improvement of the performance of each OS, so how allocate the hardware resource to the plurality of OSs is important in the semiconductor device in which the plurality of OSs operates.

There is a disclosed technique listed below.
[Patent Document 1] Japanese Unexamined Patent Application Publication No. 2009-15509.

In a multi-processor system in which a plurality of OSs is operate, Patent Document 1 discloses a technique for guaranteeing the amount of a cache memory that can be used by each processor. The multi-processor system disclosed in Patent Document 1 includes processors 1 and 2, a main memory, and a cache memory connected between the processors 1 and 2, and the main memory. The cache memory includes way 1-4, a processor designation means for holding information on the ways which the processors 1 and 2 can use, and a way selection means for selecting a way based on the setting data of the processor designation means. The cache memory performs cache allocation for the way selected by the way selection means when a cache miss occurs.

SUMMARY

In the multi-processor system disclosed in Patent Document 1, a different OS (OS_A, OS_B) operates for each processor. For example, it is assumed that the setting data of the processor designation means allocates the ways 1 and 2 to the processor 1 and allocates the ways 3 and 4 to the processor 2. In this case, the OS_A operating on the processor 1 can use the ways 1 and 2, and the OS_B operating on the processor 2 can use the ways 3 and 4. However, in the multi-processor system disclosed in Patent Document 1, it is necessary to associate the processor and the way and fix the processor on which the OS operates. Therefore, it is not possible to apply the method for allocating the way of the cache memory disclosed in Patent Document 1 to a processor system in which an OS operating on a processor dynamically switches.

Other objects and novel features will be apparent from the description of this specification and the accompanying drawings.

A semiconductor device according to an embodiment is a device in which a plurality of virtual machines managed by a hypervisor operates. The semiconductor device includes a plurality of processors which is capable of executing the plurality of virtual machines and a cache memory. The cache memory includes a plurality of ways and an allocation information storage unit which stores allocation information for setting allocation of the plurality of ways. Each of the plurality of virtual machines executes a different operating system from each other. Each of the plurality of processors includes a first identification information storage unit. The hypervisor sets the allocation information so as to allocate at least one of a plurality of ways which can be used by each of the plurality of virtual machines. When each of the plurality of processors executes any of the plurality of virtual machines, the hypervisor stores the virtual machine identification information for identifying a virtual machine executed by each of the plurality of processors in the first identification information storage unit of each of the plurality of processors executing the virtual machine. When outputting a memory access request, each of the plurality of processors outputs the virtual machine identification information stored in the first identification information storage unit of each of the plurality of processors in association with the memory access request. When the memory access request is not a cache hit, the cache memory selects a way to be replaced data based on the virtual machine identification information associated with the memory access request and the allocation information stored in the allocation information storage unit.

According to the embodiment, the hypervisor that manages the plurality of virtual machines executing different OSs sets the virtual machine identification information on each of the plurality of processors executing the virtual machine. Thus, even when the OS operating on the processor is dynamically switched, the allocation between the executing OS and the way of the cache memory can be appropriately set.

BRIEF DESCRIPTION OF THE DRAWINGS

FIG. 4 is a diagram showing an example of allocation information according to the first embodiment.

FIG. 5 is a diagram showing an example of allocation information according to the first embodiment.

FIG. 7 is a diagram showing an example of allocation information according to a first modification of the first embodiment.

FIG. 12 is a diagram showing an example of allocation authority information according to the second embodiment.

FIG. 14 is a diagram showing an example of allocation information according to the second embodiment.

FIG. 20 is a diagram showing an example of secure information according to the third embodiment.

FIG. 21 is a diagram showing an example of allocation information according to the third embodiment.

DETAILED DESCRIPTION

Figure 1:
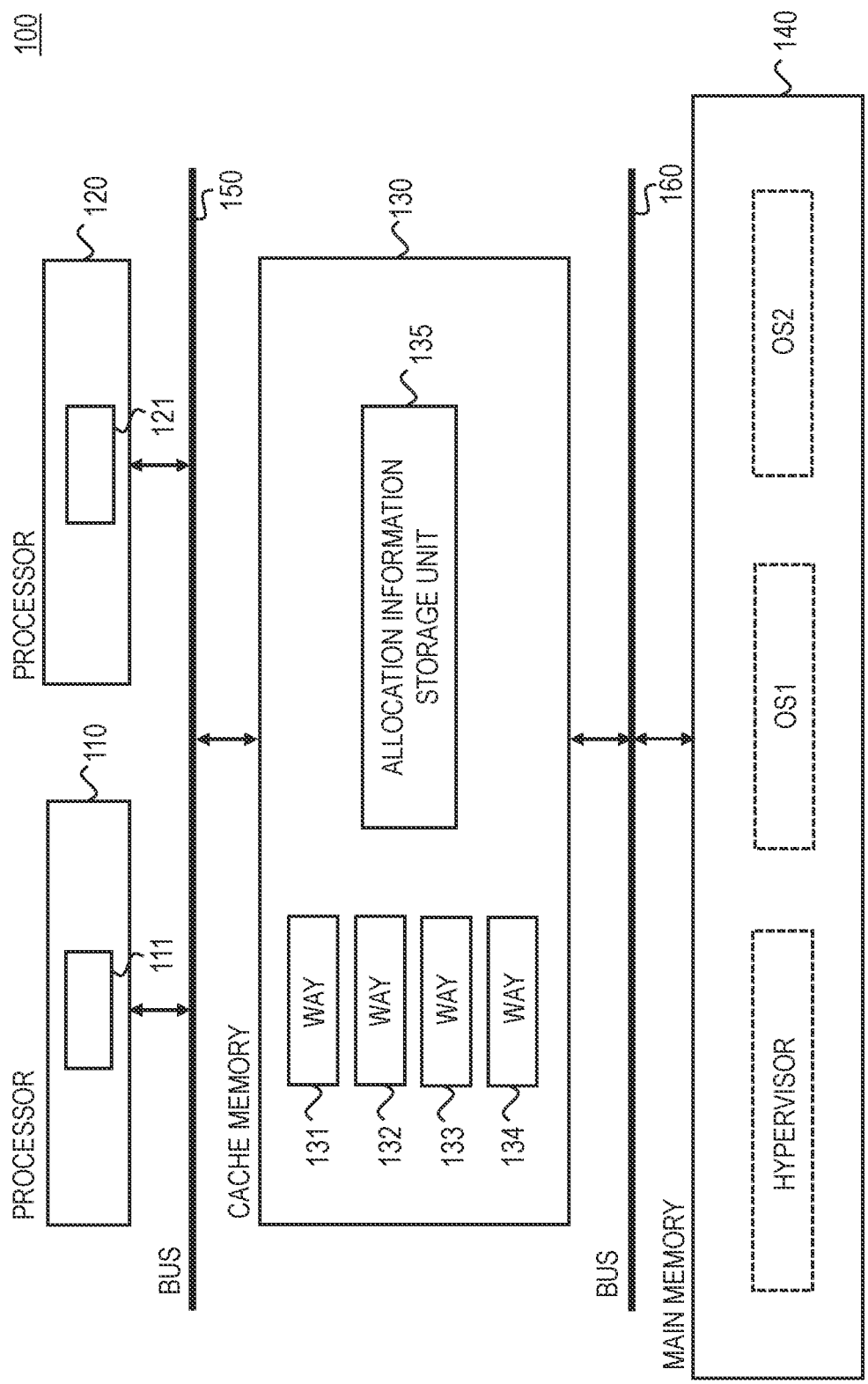
FIG. 1 is a block diagram showing an example of a configuration of a semiconductor device according to a first embodiment.

Hereinafter, embodiments will be described in detail with reference to the drawings. In the specification and the drawings, the same or corresponding components are denoted by the same reference numerals, and a repetitive description thereof is omitted. In the drawings, for convenience of description, the configuration may be omitted or simplified.

First Embodiment

FIG. 1 is a block diagram showing an example of a configuration of a semiconductor device 100 according to a first embodiment. As shown in FIG. 1, the semiconductor device 100 includes processors 110 and 120, a cache main memory 130, a main memory 140, and buses 150 and 160. The processors 110 and 120 are connected to a cache memory 130 via the bus 150. The cache memory 130 is connected to the main memory 140 via the bus 160. Therefore, the processors 110 and 120 can access data stored in the cache memory 130 and the main memory 140 via the bus 150 and 160.

Figure 2:
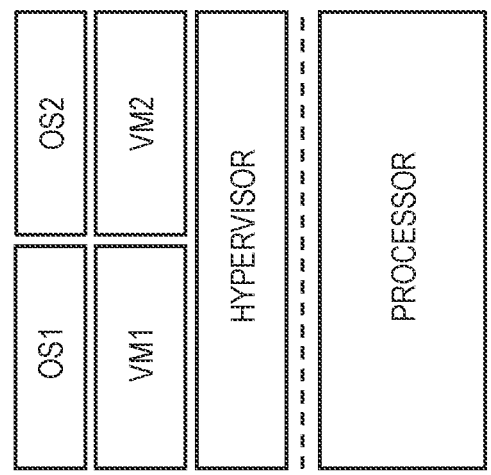
FIG. 2 is a schematic diagram for explaining a configuration of software according to the first embodiment.

In the semiconductor device 100 according to the first embodiment, a plurality of virtual machines (VMs) managed by a hypervisor operates. Here, the concept of the VM will be described with reference to FIG. 2. FIG. 2 is a schematic diagram for explaining a configuration of software according to the first embodiment. As shown in FIG. 2, a hypervisor, which is virtualization software, is implemented on a processor. On the hypervisor, a first VM (VM1) and a second VM (VM2) are configured. The hypervisor manages the execution schedule of the VM1 and the VM2 by creating, executing, and switching the VM1 and the VM2.

Each of the plurality of VMs according to the first embodiment executes a different OS from each other. As shown in FIG. 2, the VM1 executes a first operating system (OS1) and the OS1 operates on the VM1. The VM2 executes a second operating system (OS2) and the OS2 operates on the VM2. The OS1 and the OS2 are different OSs from each other. The hypervisor can manage the execution of the OS1 and OS2 by having the VM1 perform the OS1 and having the VM2 perform the OS2.

In the first embodiment, a semiconductor device 100 in which two VMs and two OSs managed by a hypervisor operate is exemplified. However, the number of VMs and OSs is not limited to this. The number of VMs and OSs may be multiple.

In FIG. 1, the processor 110 includes a first identification information storage unit 111 for storing identification information. When the processor 110 executes the hypervisor, hypervisor identification information (HYID), which is information for identifying the hypervisor, is stored in the first identification information storage unit 111. When the processor 110 executes the VM, virtual machine identification information (VMID), which is information for identifying the VM, is stored in the first identification information storage unit 111.

The processor 120 includes a first identification information storage unit 121 for storing identification information. When the processor 120 executes the hypervisor, an HYID is stored in the first identification information storage unit 121. When the processor 120 executes the VM, a VMID is stored in the first identification information storage unit 121.

The VMID includes a VMID (VMID1) for identifying the VM1 and a VMID (VMID2) for identifying the VM2. When the processor 110 executes the VM1, a VMID1 is stored in the first identification information storage unit 111. When the processor 110 executes the VM2, a VMID2 is stored in the first identification information storage unit 111. When the processor 120 executes the VM1, a VMID1 is stored in the first identification information storage unit 121. When the processor 120 executes VM2, a VMID2 is stored in the first identification information storage unit 121. Therefore, when the VM is operating on the semiconductor device 100, the VMs executed by the processors 110 and 120 can be specified by referring to the VMIDs stored in the first identification information storage units 111 and 121.

Further, when each of the processors 110 and 120 outputs a memory access request to the cache memory 130 via the bus 150, each of the processors 110 and 120 outputs the HYID or the VMID stored in the first identification information storage unit of each of the processors 110 and 120 in association with the memory access request. When it is determined in the cache memory 130 that the memory access request is not a cache hit, the HYID or the VMID output in association with the memory access request is used as information for determining a way of the cache memory 130 to be replaced data.

The cache memory 130 includes ways 131-134 and an allocation information storage unit 135. In the first embodiment, a 4four way set associative cache memory is exemplified. Further, the allocation information storage unit 135 stores allocation information. The allocation information is information for setting allocation of the ways 131-134. In the first embodiment, the allocation information is set so as to allocate ways that can be used by at least one of the hypervisor, the VM1, and the VM2.

The cache memory 130 receives a memory access request output from each of the processors 110 and 120 via the bus 150. The cache memory 130 determines whether or not the memory access request is a cache hit by comparing the address included in the memory access request with the information stored in each of the ways 131-134. If it is determined that the memory access request is a cache hit, the cache memory 130 accesses any of the ways 131-134 to read data or write data, Meanwhile, when it is determined that the memory access request is not a cache hit, the cache memory 130 selects a way to be replaced data based on the HYID or the VMID output from each of the processors 110 and 120 in association with the memory access request, and the allocation information stored in the allocation information storage unit 135.

The main memory 140 stores data of the hypervisor, data of the OS1, and data of the OS2. The data of hypervisor includes programs for the hypervisor and various data used by the hypervisor. The data of OS1 includes programs for the OS1 and various data used by the OS1. The data of OS2 includes programs for the OS2 and various data used by the OS2.

The processors 110 and 120 reads and executes the programs for the hypervisor stored in the main memory 140. The processors 110 and 120 executes the hypervisor or the VM by executing the programs for the hypervisor. The functions of the hypervisor, i.e., creation, execution, and switching of the VMs by the hypervisor, are realized by executing the programs for the hypervisor by the processors 110 and 120.

When the VM1 executes the OS1, the processors 110 and 120 read and execute the programs for the OS1 stored in the main memory 140. When the VM2 executes the OS2, the processors 110 and 120 read and execute the programs for the OS2 stored in the main memory 140.

Figure 3:
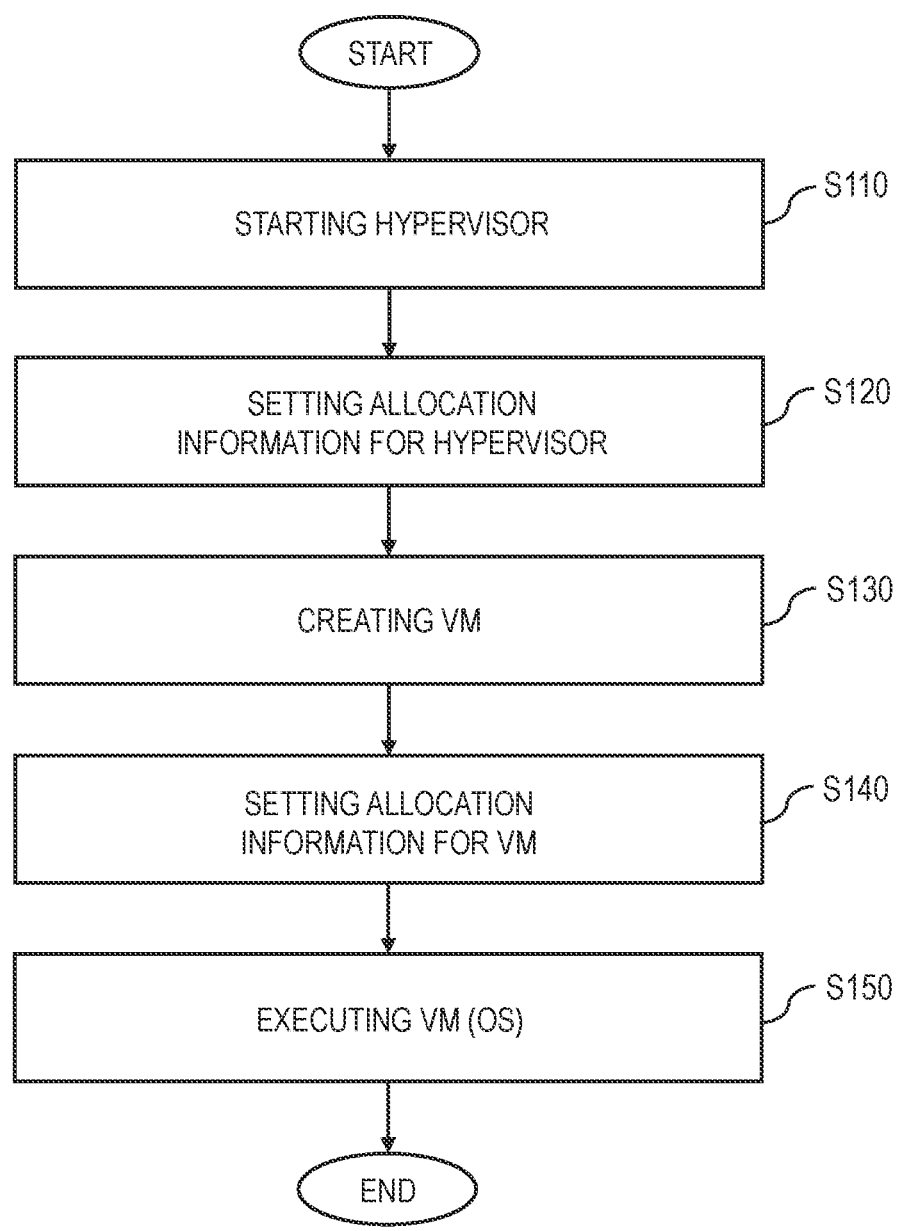
FIG. 3 is a flowchart showing an example of an operation of the semiconductor device according to the first embodiment.

Next, an operation of the semiconductor device 100 according to the first embodiment will be described. FIG. 3 is a flowchart showing an example of an operation of the semiconductor device 100 according to the first embodiment. First, in a step S110, processing of starting a hypervisor is performed. In the processing of the step S110, at least one of the processors 110 and 120 reads and executes the programs for the hypervisor stored in the main memory 140. This activates the hypervisor.

If each of the processors 110 and 210 executes the hypervisor, the hypervisor stores an HYID in the first identification information storage unit of each of the processors 110 and 120 executing the hypervisor. That is, when the processor 110 executes the hypervisor, the hypervisor stores an HYID in the first identification information storage unit 111. When the processor 120 executes the hypervisor, the hypervisor stores an HYID in the first identification information storage unit 121.

Next in a step S120, processing of setting allocation information for the hypervisor is performed. In the step S120, the hypervisor sets allocation information so as to allocate at least one of the ways 131-134 that can be used by the hypervisor.

Figure 4:
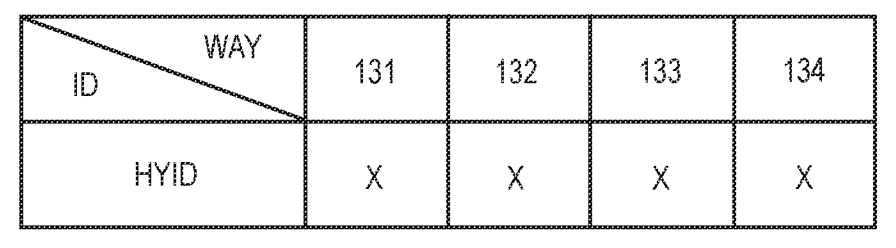

FIG. 4 is a diagram showing an example of allocation information according to the first embodiment. Allocation information is configured by associating identification information (ID) with a way. As shown in FIG. 4, the hypervisor sets, using the HYID, a correspondence relation between the hypervisor and each of the ways 131-134. The HYID is information for identifying the hypervisor and is unique information associated with the hypervisor. In FIG. 4, the allocation is indicated using the notation "X". The same notation applies to the drawings other than FIG. 4. The hypervisor includes the correspondence relation between the hypervisor and each of the ways 131-134 in the allocation information and stores it in the allocation information storage unit 135.

In FIG. 4, all ways 131-134 are allocated to the hypervisor. Thus, when each of the processors 110 and 120 outputs a memory access request while executing the hypervisor, all of the ways 131-134 may be accessed. However, the hypervisor can also set the allocation information so that the hypervisor can use only some of the ways 131-134. The hypervisor can also set the allocation information so that the hypervisor cannot use any of the ways 131-134.

Next, in a step S130, processing of creating a VM is performed. In the step S130, the hypervisor creates a VM. The processing of creating the VM includes processing of securing a memory area in which the VM operates and creating a VMID that is the identification information of the VM. In the first embodiment, the hypervisor creates the VM1 for executing the OS1 and the VM2 for executing the OS2. Further, in the creation of the VM1 and the VM2, the hypervisor creates a VMID1 that is unique information associated with the VM1 and a VMID2 that is unique information associated with the VM2.

Next, in a step S140, processing of setting allocation information for VMs is performed. In the step S140, the hypervisor sets the allocation information so as to allocate at least one of the ways 131-134 which can be used by each of the VM1 and the VM2.

Figure 5:
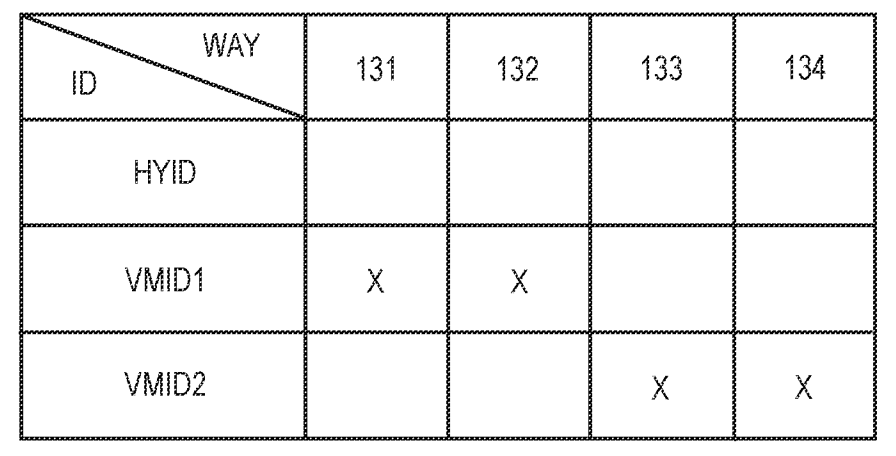

FIG. 5 is a diagram showing example of allocation information according to the first embodiment. As shown in FIG. 5, the hypervisor sets, using the VMID1 and the VMID2, a correspondence relation between each of the VM1 and the VM2 and each of the ways 131-134. In the example of FIG. 5, the VMID1 and the ways 131 and 132 are associated, and the VMID2 and the ways 133 and 134 are associated. Thus, the VM1 can use the ways 131 and 132, and the VM2 can use the ways 133 and 134. Further, since all 131-134 have been allocated to the VMs, the allocation information is updated to avoid allocating a way to the hypervisor. The hypervisor includes the correspondence relation between each of the VM1 and the VM2 and each of the ways 131-134 in the allocation information and stores it in the allocation information storage unit 135.

In FIG. 5, the ways are not allocated to the hypervisor, the ways 131 and 132 are allocated to the VM1, and the ways 133 and 134 are allocated to the VM2, but the present disclosure is not limited to this. For example, the ways 131 and 132 may be allocated to the hypervisor, the way 133 may be allocated to the VM1, and the way 134 may be allocated to the VM2, Further, it is not necessary to allocate the same number of ways to the VM1 and the VM2. Depending on the contents of the processing performed by each of the VMs, the number of ways to be allocated can be adjusted. For example, the ways 131-133 may be allocated to the VM1, and the way 134 may be allocated to the VM2.

Finally, in a step S150, processing of executing VMs (OSs) is performed. In the step S150, the hypervisor executes the VM1 and the VM2. The hypervisor manages the execution of the OS on a VM-by-VM basis by controlling the execution schedules of the VM1 executing the OS1 and the VM2 executing the OS2.

The hypervisor determines the processors 110 and 120 that execute the VM1 and the VM2 when controlling the execution schedules of the VM1 and the VM2. Further, the hypervisor stores the VMID of the VM executed by each of the processors 110 and 120 in the first identification storage unit of each of the processors 110 and 120 executing the VM when each of the processors 110 and 120 executes one of the VM1 and the VM2. For example, when both of the processors 110 and 120 execute the VM1, the hypervisor stores the VMID1 in both of the first identification information storage units 111 and 121. When the processor 110 executes the VM1 and the processor 120 executes the VM2, the hypervisor stores the VMID1 in the first identification information storage unit 111 and the VMID2 in the first identification information storage unit 121.

When switching the VMs executed by the processors 110 and 120, the hypervisor stores the next VMID to be executed in the first identification information storage units 111 and 121. For example, when the VM1 is operating on the processor 111, the VMID1 is stored in the first identification information storage unit 111. Subsequently, when the VM operating on the processor 111 switches from the VM1 to the VM2, the hypervisor stores the VMID2 in the first identification information storage unit 111. When the VM is switched, data such as the value of the internal register related to the current VM is saved in the stack, and data such as the value of the internal register related to the next VM is read from the stack.

Figure 6:
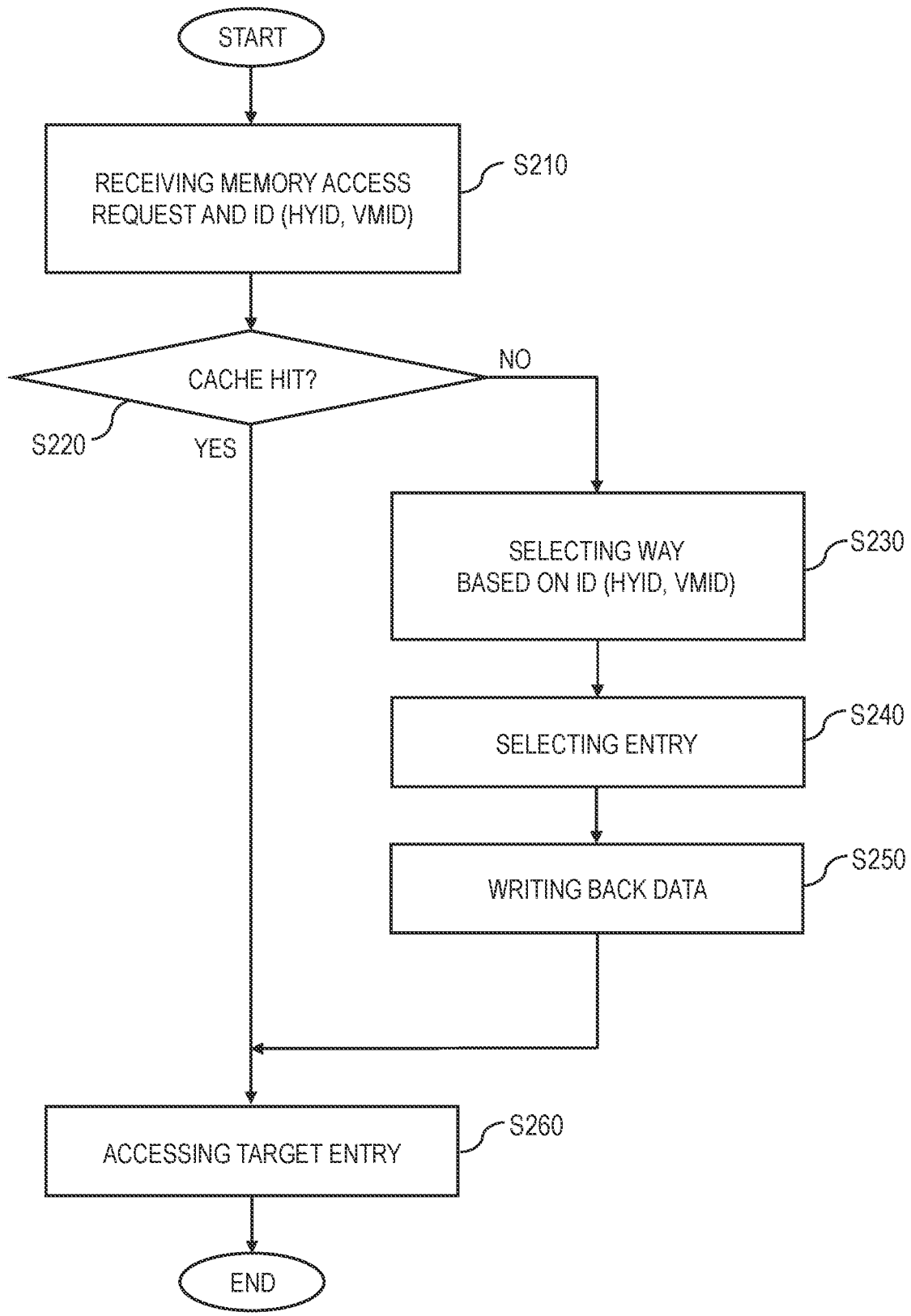
FIG. 6 is a flowchart showing an example of an operation of a cache memory according to the first embodiment.

Next, an operation of the cache memory 130 according to the first embodiment will be described. FIG. 6 is a flowchart showing an example of an operation of the cache memory 130 according to the first embodiment. Each of the processors 110 and 120 outputs a memory access request to the cache memory 130 during execution of the hypervisor or the VM. In FIG. 6, an operation of the cache memory 130 that operates in response to the memory access request will be described.

First, in a step S210, processing of receiving a memory access request and IDs (HYID, VMID) is performed. In the step S210, the cache memory 130 receives a memory access request from each of processors 110 and 120 via bus 150.

Further, when outputting the memory access request, each of the processors 110 and 120 outputs an HYID or a VMID stored in the first identification information storage unit to the cache memory 130 in association with the memory access request. That is, when outputting the memory access request to the cache memory 130 while executing the hypervisor, each of the processors 110 and 120 outputs the HYID stored in the first identification information storage unit in association with the memory access request. Further, when outputting the memory access request to the cache memory 130 while executing the VM, each of the processors 110 and 120 outputs the VMID stored in the first identification information storage unit in association with the memory access request. The cache memory 130 receives, via the bus 150, the HYID or the VMID associated with the memory access request from each of processors 110 and 120.

Each of the processors 110 and 120 may include the HYID or the VMID in the memory access request and output it. Alternatively, the processors 110 and 120 may append the HYID or the VMID to the memory access request and output it.

Next, in a step S220, processing of determining whether or not the memory access request is a cache hit is performed. Each of the ways 131-134 includes a tag memory portion and a data memory portion and includes a plurality of entries including a tag address stored in the tag memory portion and data stored in the data memory portion. The memory access request output from each of the processors 110 and 120 includes an address having a tag portion and an index portion. In the step S220, upon receipt of the memory access request output from each of the processors 110 and 120, the cache memory 130 selects an entry specified by the index portion of the address from each of the ways 131-134. The cache memory 130 compares the tag address included in the selected entry with the tag portion of the address to determine whether or not the memory access request output from each of the processors 110 and 120 is a cache hit.

In the step S220, when the tag address matches the tag portion of the address, the cache memory 130 determines that the memory access request is a cache hit. In this case, the data related to the memory access request is stored in the cache memory 130. When it is determined that the memory access request is a cache hit (YES in the step S220), the processing proceeds to a step S260. Meanwhile, when the tag address and the tag portion of the address do not match, the cache memory 130 determines that the memory access request is not a cache hit. In this case, the data related to the memory access request is not stored in the cache memory 130. When it is determined that the memory access request is not a cache hit (NO in the step S220), the processing proceeds to a step S230.

In a step S230, processing of selecting a way based on IDs (HYID, VMID) is performed. In the step S230, when the memory access request is not a cache hit, the cache memory 130 selects a way to be replaced data from the ways 131-134 based on an HYID or a VMID associated with the memory access request and the allocation information stored in the allocation information storage unit 135. The way to be replaced the data becomes a way for storing the data related to the memory access request.

When the memory access request is not a cache hit, the cache memory 130 confirms the HYID or the VMID output in association with the memory access request from each of the processors 110 and 120 and refers to the allocation information stored in the allocation information storage unit 135.

When receiving the HYID associated with the memory access request, the cache memory 130 recognizes that the memory access request is a memory access request output during operation of the hypervisor. At this time, for example, when the allocation information stored in the allocation information storage unit 135 includes the information shown in FIG. 4, the cache memory 130 selects the way 131-134 as the ways to be replaced the data based on the HYID and the allocation information shown in FIG. 4.

When receiving the VMID1 associated with the memory access request, the cache memory 130 recognizes that the memory access request is a memory access request output during the operation of the VM1. At this time, for example, when the allocation information stored in the allocation information storage unit 135 includes the information shown in FIG. 5, the cache memory 130 selects the way 131 and 132 as the ways to be replaced the data based on the VMID1 and the allocation information shown in FIG. 5.

When receiving the VMID2 associated with the memory access request, the cache memory 130 recognizes that the memory access request is a memory access request output during the operation of the VM2. At this time, for example, when the allocation information stored in the allocation information storage unit 135 includes the information shown in FIG. 5, the cache memory 130 selects the ways 133 and 134 as the ways to be replaced the data based on the VMID2 and the allocation information shown in FIG. 5.

Next, in a step S240, processing of selecting an entry is performed. In the step S240, the cache memory 130 selects one entry from the entries specified by the index portion of the address of the selected way. If there is a plurality of ways to be selected, the cache memory 130 must determine which way entry to select. However, the method is not particularly limited. For example, when the tag memory portion of each entry includes a valid flag or reference history information, an entry may be selected based on the information. The valid flag is information indicating the validity of the data in the entry. If there is an entry for which the valid flag is set and an entry for which the valid flag is not set, the cache memory 130 may select the entry for which the valid flag is set. Further, the reference history information is information indicating the access frequency to the entry. The cache memory 130 may select the longest unreferenced entry based on the reference history information.

Next, in a step S250, processing of writing back data is performed. In the step S250, the cache memory 130 writes the data stored in the data memory portion of the selected entry back to the corresponding address of the main memory 140. If the selected entry contains information indicating that the valid flag is not set or that data need not be written back to the main memory 140, the processing of the step S250 can be omitted.

Finally, at a step S260, processing of accessing the target entry is performed. If the memory access request is a cache hit, the entry that stores the tag address that matches the tag portion of the address becomes an entry to be accessed (target entry). On the other hand, if the memory access request is not a cache hit, the entry selected in the processing of the step S240 becomes an entry to be accessed (target entry). In the step S260, the cache memory 130 accesses the target entry.

A Memory access request include read and write requests. When the memory access request that is a cache hit is a read request, the cache memory 130 reads data from the data memory portion of the target entry. The cache memory 130 outputs the data read from the target entry as data (read data) related to the read request to the processor that is the issuer of the memory access request.

Meanwhile, when the memory access request that is a cache hit is a write request, the cache memory 130 receives data (write data) related to the write request output from the processor that is the issuer of the memory access request. The cache memory 130 stores the write data in the data memory portion of the target entry.

Further, when the memory access request that is not a cache hit is a read request, the cache memory 130 reads data from the corresponding address of the main memory 140. The cache memory 130 stores the data read from the main memory 140 as data (read data) related to the read request in the data memory portion of the target entry. That is, the cache memory 130 reads read data from the main memory 140 and stores it in the way selected in the step S230. The cache memory 130 outputs the read data to the processor that is the issuer of the memory access request.

Meanwhile, when the memory access request that is not a cache hit is a write request, the cache memory 130 receives data (write data) related to the write request output from the processor that is the issuer of the memory access request. The cache memory 130 stores the write data in the data memory portion of the target entry. That is, the cache memory 130 stores the write data in the way selected in the step S230.

In this manner, if the memory access request is not a cache hit, the cache memory 130 performs data replacement processing within the range of the way set by the allocation information. Thus, data replacement processing does not occur for a way that is not set by the allocation information. For example, when the allocation information includes the information shown in FIG. 5 and the VM1 is being executed, the data related to the VM2 stored in the ways 133 and 134 is not expelled by the processing of the VM1. In addition, the data related to the VM1 stored in the ways 131 and 132 is not expelled by the processing of the VM2.

As described above, according to the first embodiment, a hypervisor sets allocation information so as to allocate at least one of a plurality of ways that can be used by each of a plurality of VMs executing a different OS from each other. When a processor executes the VM (OS), the hypervisor sets a VMID on the processor that executes the VM (OS). When outputting a memory access request to a cache memory, the processor outputs the set VMID in association with the memory access request. When the memory access request is not a cache hit, the cache memory selects a way to be replaced data based on the VMID and the allocation information. As described above, in the semiconductor device according to the first embodiment, even when the OS operating on the processor is dynamically switched, the allocation between the executing OS, in other words, the VM executing the OS and the cache memory can be appropriately set.

First Modification of First Embodiment

Next, a first modification of the first embodiment will be described. In the first embodiment, the allocation information is set so that each of the hypervisor and the VM exclusively possesses each way. For example, in the case of FIG. 5, the VM1 can exclusively use the ways 131 and 132, and the VM2 can exclusively use the ways 133 and 134. However, in the first modification of the first embodiment, the allocation information is set so that the hypervisor and the VM share one way.

FIG. 7 is a diagram showing an example of allocation information according to the first modification of the first embodiment. In FIG. 7, the VMID1 is associated with the ways 131-133 and the VMID2 is associated with the ways 132-134. Thus, the VM1 can use the ways 131-133 and the VM2 can use the ways 132-134. In this case, the ways 132 and 133 are shared by the VM1 and the VM2.

For example, it is assumed that the maximum usage of the cache memory 130 in the OS1 operating on the VM1 and the maximum usage of the cache memory 130 in the OS2 operating on the VM2 is ¾ of the capacity of the cache memory 130, respectively. It is also assumed that the utilization of the cache memory 130 of the OS1 operating on the VM1 and the OS2 operating on the VM2 is less than ½ of the capacity of the cache memory 130 in most hours.

According to the allocation information shown in FIG. 7, the OS1 operating on the VM1 can always use the way 131 (¼ of the capacity of the cache memory 130), and at maximum the ways 131-133 (¾ of the capacity of the cache memory 130) can be used. Further, the OS2 operating on the VM2 can always use the way 134 (¼ of the capacity of the cache memory 130) and at maximum the ways 132-134 (¾ of the capacity of the cache memory 130) can be used. In this case, the use efficiency of the cache memory 130 can be expected to be improved by sharing some ways.

Thus, according to the first modification of the first embodiment, a hypervisor sets allocation information so that at least one of a plurality of ways is shared by at least two VMs among a plurality of VMs. As a result, the plurality of ways of the cache memory can be flexibly used, and the utilization efficiency of the cache memory can be improved.

Second Modification of First Embodiment

Figure 8:
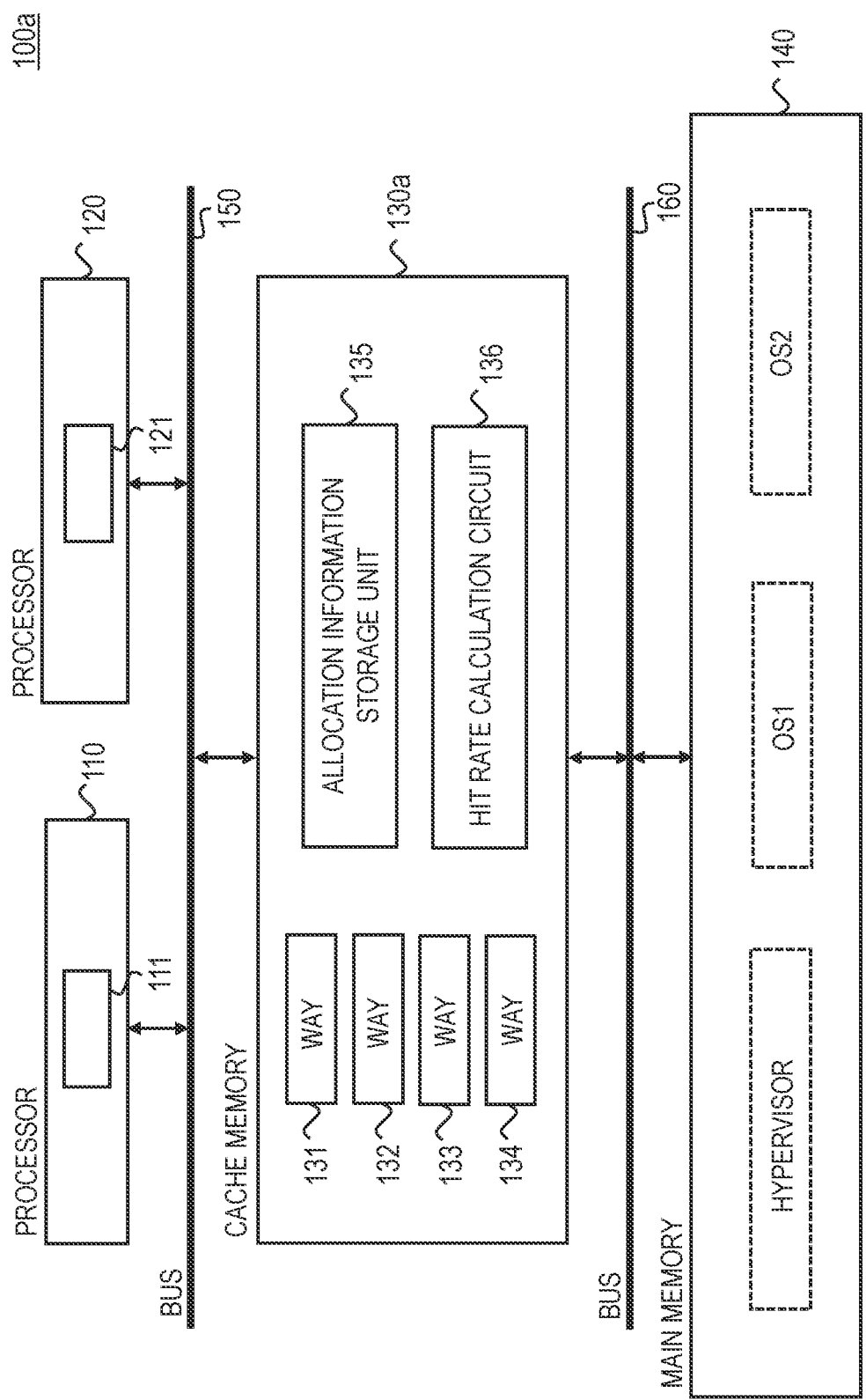
FIG. 8 is a block diagram showing an example of a configuration of a semiconductor device according to a second modification of the first embodiment.

Next, a second modification of the first embodiment will be described. The allocation information according to the first embodiment is not dynamically modified, but the allocation information according to the second modification of the first embodiment is dynamically modified according to a cache hit rate. FIG. 8 is a block diagram showing an example of a configuration of a semiconductor device 100a according to the second modification of the first embodiment. As shown in FIG. 8, the cache memory 130 of FIG. 1 is changed to a cache memory 130a.

The cache memory 130a includes a hit rate calculation circuit 136 in addition to the configuration of the cache memory 130 in FIG. 1. The hit rate calculation circuit 136 monitors a memory access request output from each of the processors 110 and 120 during execution of the VM. The hit rate calculation circuit 136 counts, for each VM, the number of memory access requests determined to be cache hits based on a VMID associated with the memory access request. The hit rate calculation circuit 136 calculates a cache hit rate for each VM based on the counted result. The hit rate calculation circuit 136 calculates the hit rate every predetermined period.

The hypervisor receives the cache hit rate calculated for each VM from the hit rate calculation circuit 136 and calculates a difference between the cache hit rates of the VMs. For example, if the cache hit rate of the VM1 is 70% and the cache hit rate of the VM2 is 95%, the difference between the cache hit rates of the VMs is 25%. The hypervisor compares the calculated difference in the cache hit rate with a predetermined value.

If the calculated difference in the cache hit rate is larger than the predetermined value, the hypervisor modifies the allocation information so as to increase the number of ways which can be used by the VM with the lower cache hit rate or modifies the allocation information so as to decrease the number of ways which can be used by the VM with the higher cache hit rate. The predetermined value is a threshold value for determining whether or not to modify the allocation information. For example, if the cache hit rate of the VM1 is 70%, the cache hit rate of the VM2 is 95%, and the predetermined value is 20%, the difference between the cache hit rates of the VMs is 25%, which is larger than the predetermined value. In this case, the hypervisor modifies the allocation information so as to increase the number of ways which can be used by the VM1, modifies the allocation information so as to decrease the number of ways which can be used by the VM2, or modifies the allocation information so as to increases the number of ways which can be used by the VM1 and decrease the number of ways which can be used by the VM2.

As described above, according to the second modification of the first embodiment, the hit rate calculation circuit calculates a cache hit rate for each VM. The hypervisor dynamically modifies allocation information based on the difference in the cache hit rate of the VM. As a result, even when a deviation occurs in the cache hit rate for each VM, the allocation information can be automatically adjusted so as to suppress the deviation.

Second Embodiment

Figure 9:
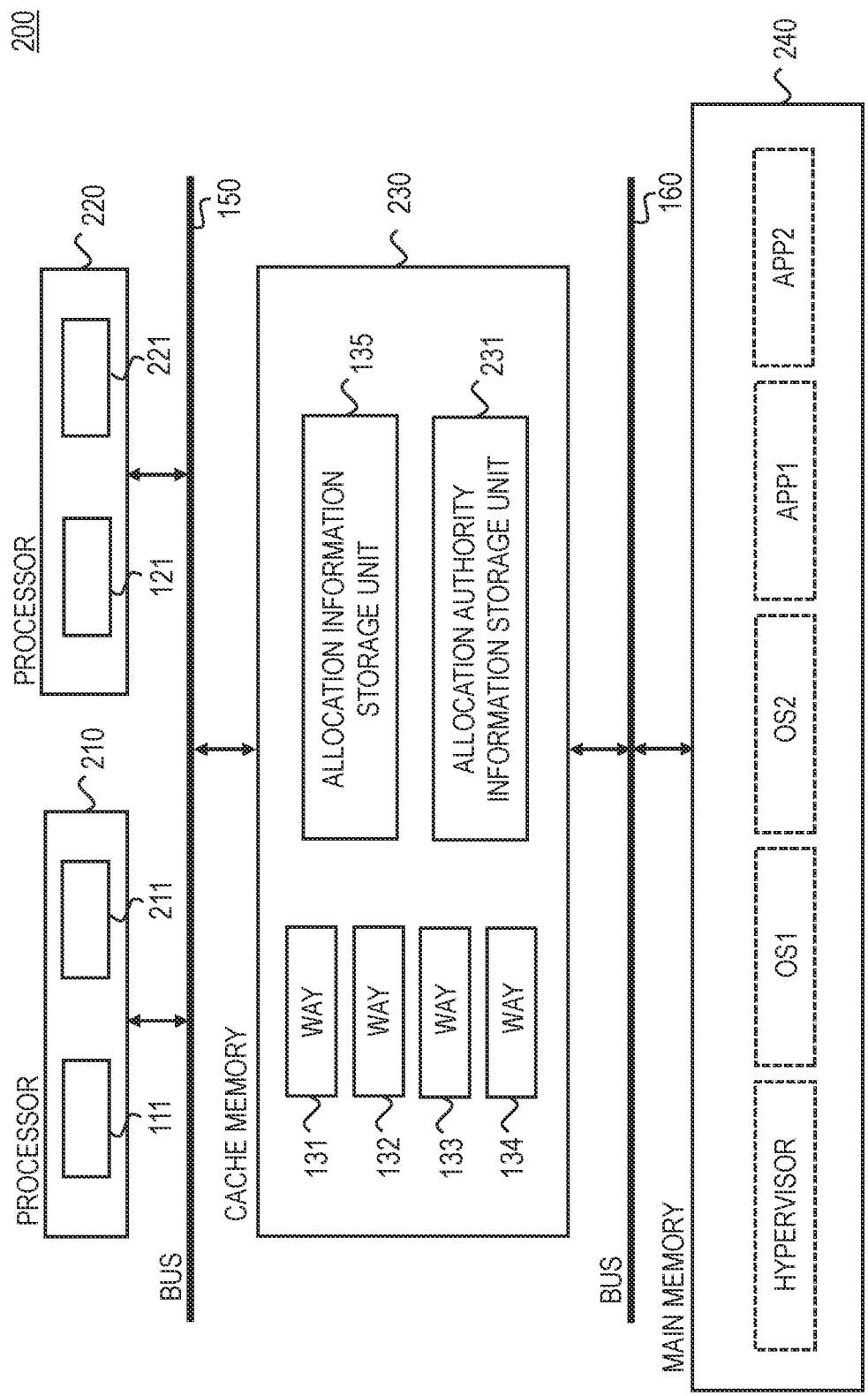
FIG. 9 is a block diagram showing an example of a configuration of a semiconductor device according to the second embodiment.

Next, a second embodiment will be described. A semiconductor device according to the second embodiment is different from the semiconductor device according to the first embodiment in that an OS allocates a way to software such as the OS and an application (APP) operating on the OS. FIG. 9 is a block diagram showing an example of a configuration of a semiconductor device 200 according to the second embodiment. As shown in FIG. 9, the processors 110 and 120, the cache memory 130, and the main memory 140 of FIG. 1 are changed to processors 210 and 220, a cache memory 230, and a main memory 240, respectively.

Figure 10:
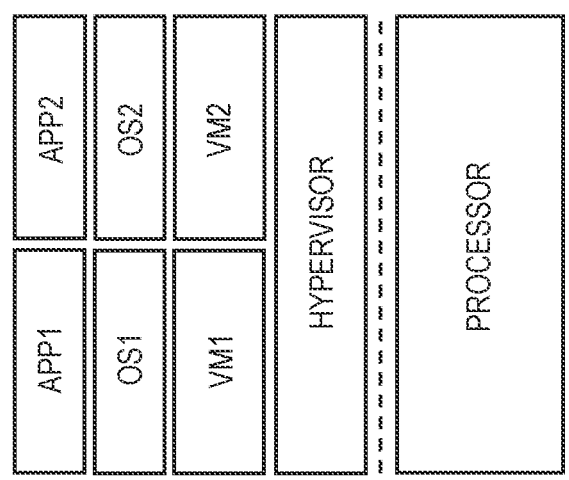
FIG. 10 is a schematic diagram for explaining a configuration of software according to the second embodiment.

In the semiconductor device 200 according to the second embodiment, an APP operates on an OS executed by a VM. FIG. 10 is a schematic diagram for explaining a configuration of software according to the second embodiment. As shown in FIG. 10, the VM1 executes a first application (APP1) on the OS1, and the APP1 operates on the OS1. The VM2 executes a second application (APP2) on the OS2, and the APP2 operates on the OS2. Configurations other than the APP1 and the APP2 are the same as those in FIG. 2. In the second embodiment, the APP1 operating on the OS1 and the APP2 operating on the OS2 are exemplified, but the number of APPs operating on the VM is not limited to one.

In FIG. 9, the processor 210 includes a second identification information storage unit 211 for storing identification information in addition to the first identification information storage unit 111. When the processor 210 executes the OS, first software identification information (SWID1) for identifying the OS is stored in the second identification information storage unit 211. When the processor 210 executes the APP, second software identification information (SWID2) for identifying the APP is stored in the second identification information storage unit 211.

The processor 220 includes a second identification information storage unit 221 for storing identification information in addition to the first identification information storage unit 121. When the processor 220 executes the OS, an SWID1 is stored in the second identification information storage unit 221. When the processor 220 executes the APP, an SWID2 is stored in the second identification information storage unit 221.

As described above, two types of software identification information (SWID) can be stored in the second identification information storage units 211 and 221. Even when any of the OS1 and the OS2 is executed, an SWID1 is stored in the second identification information storage units 211 and 221. Further, even when any of the APP1 and the APP2 is executed, an SWID2 is stored in the second identification information storage units 211 and 221.

Further, when outputting a memory access request to the cache memory 230 via the bus 150, each of the processors 210 and 220 outputs, in addition to the VMID stored in the first identification information storage unit, the SWID1 or the SWID2 stored in the second identification information storage unit in association with the memory access request. The VMID, and the SWID1 or the SWID2 output in association with the memory access request are used as information for determining a way of the cache memory 230 to be replaced data when it is determined in the cache memory 230 that the memory access request is not a cache hit.

The cache memory 230 includes an allocation authority information storage unit 231 in addition to the configuration of the cache memory 130 of FIG. 1. The allocation authority information storage unit 231 stores allocation authority information. The allocation authority information is information for granting an authority to allocate at least one of ways 131-134 to the OS executed by the VM.

The main memory 240 stores data of the APP1 and data of the APP2 in addition to the data of the hypervisor, the data of the OS1 and the data of the OS2. The data of the APP1 includes programs for the APP1 and various data used by the APP1. The data of APP2 includes programs for the APP2 and various data used by the APP2.

When the VM1 executes the APP1, the processors 210 and 220 reads and executes the programs for the APP1 stored in the main memory 240. When the VM2 executes the APP2, the processors 210 and 220 reads and executes the programs for the APP2 stored in the main memory 240.

Figure 11:
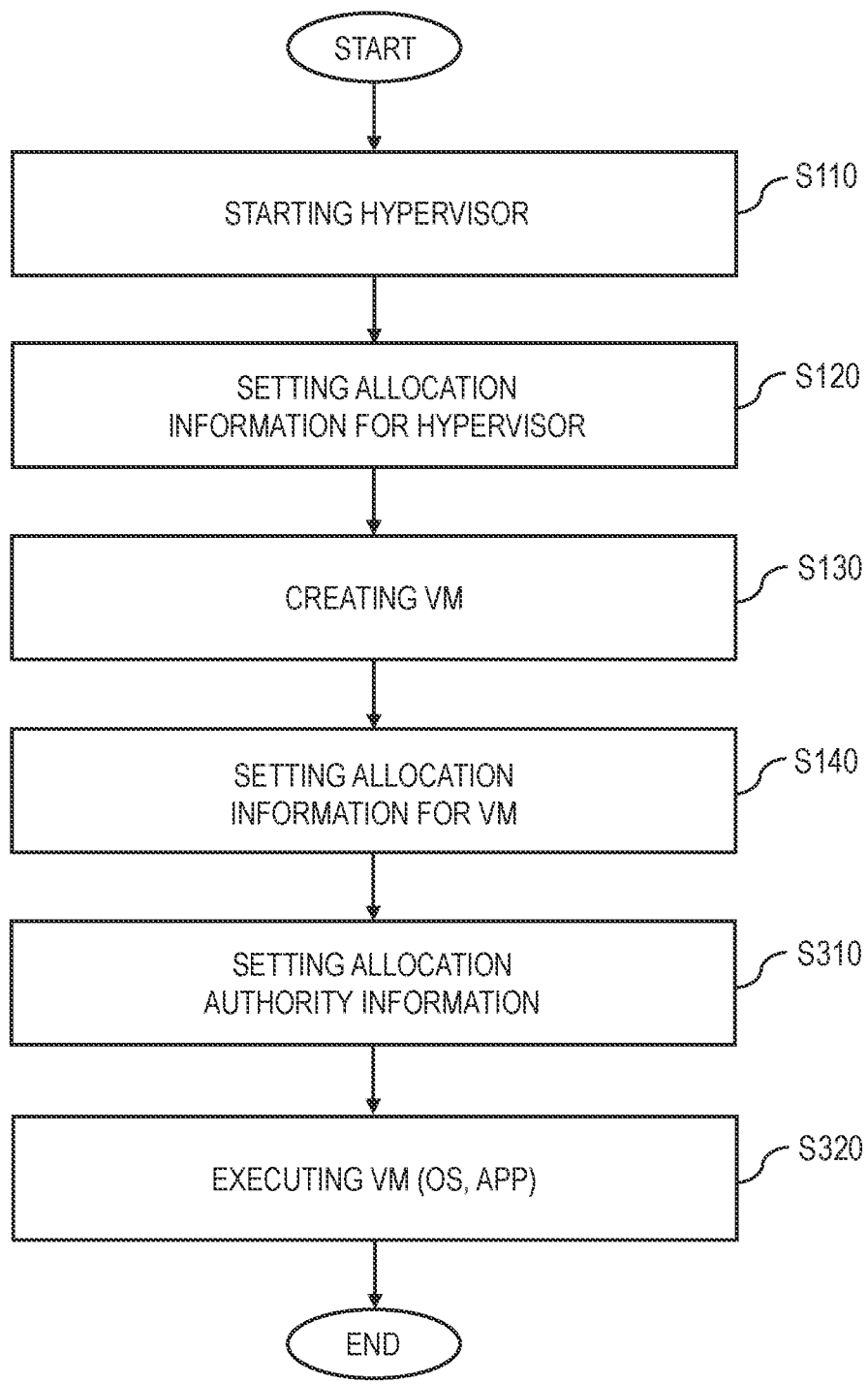
FIG. 11 is a flowchart showing an example of an operation of the semiconductor device according to the second embodiment.

Next, an operation of the semiconductor device 200 according to the second embodiment will be described. FIG. 11 is a flowchart showing an example of an operation of the semiconductor device 200 according to the second embodiment. As shown in FIG. 11, the flowchart of FIG. 11 includes the processing of the steps S110-S140 shown in FIG. 3. Further, in FIG. 11, the step S150 of FIG. 3 is changed to a step S320, and a step S310 is added between the step S140 and the step S320.

In the step S310, processing of setting allocation authority information is performed. In the processing of the step S310, the hypervisor sets allocation authority information for granting an authority to allocate at least one of the ways 131-134 to the OS to be executed by each of the plurality of VMs and stores it in the allocation authority information storage unit 231.

Figure 12:
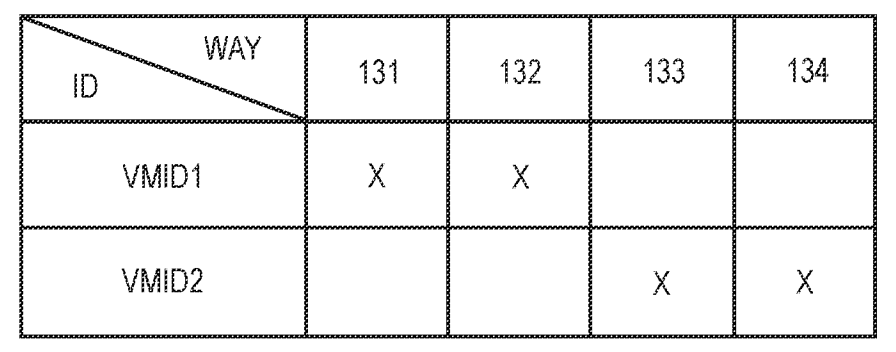

FIG. 12 is a diagram showing an example of allocation authority information according to the second embodiment. The allocation authority information is configured by associating a VMID with a way. As shown in FIG. 12, the hypervisor sets, using the VMID, a correspondence relation between each of the VM1 and the VM2 and each of the ways 131-134. In the example of FIG. 12, the VMID1 is associated with the ways 131 and 132, and the VMID2 is associated with the ways 133 and 134. Therefore, the OS1 operating on the VM1 is authorized to allocate the ways 131 and 132. Further, the OS2 operating on the VM2 is authorized to allocate the ways 133 and 134.

Next, in the step S320, processing of executing the VM (OS, APP) is performed. In the step S320, since the VM is executed, as described in the step S150 of FIG. 3, the hypervisor stores the VMID of the VM to be executed by the processors 210 and 220 in the first identification information storage unit of each of the processors 210 and 220 executing the VM. Further, when outputting a memory access request while executing the VM, each of the processors 210 and 220 outputs the VMID stored in the first identification information storage unit of each of the processors 210 and 220 in association with the memory access request.

Furthermore, when each of the processors 210 and 220 executes an OS or an APP, the OS operating on the VM stores an SWID1 or an SWID2 in the second identification information storage unit of each of the processors 210 and 220 executing the OS or the APP. That is, the OS1 operating on the VM1 stores the SWID1 in the second identification information storage unit 211 when the processing of the OS1 (the processing of the OS1 kernel) is executed on the processor 210. The OS1 operating on the VM1 stores the SWID2 in the second identification information storage unit 211 when the processing of the APP1 is executed on the processor 210. The OS2 operating on the VM2 stores the SWID1 in the second identification information storage unit 221 when the processing of the OS2 (the processing of the OS2 kernel) is executed on the processor 220. The OS2 operating on the VM2 stores the SWID2 in the second identification information storage unit 221 when the processing of the APP2 is executed on the processor 220.

Further, when outputting a memory access request to the cache memory 230 while executing the processing of the OS or the APP, each of the processors 210 and 220 outputs the SWID1 or the SWID2 stored in the second identification information storage unit of each of the processors 210 and 220 in association with the memory access request. That is, when outputting the memory access request to the cache memory 230 while executing the processing of the OS1 or the OS2, each of the processors 210 and 220 outputs the SWID1 stored in the second identification information storage unit in association with the memory access request. Further, when outputting the memory access request to the cache memory 230 while executing the processing of the APP1 or the APP2, each of the processors 210 and 220 outputs the SWID2 stored in the second identification information storage unit in association with the memory access request.

As described above, in the processing of executing the VM (OS, APP) of the step S320, not only the processing in which the hypervisor stores the VMID in the first identification information storage unit is performed, but also the processing in which the OS stores the SWID1 or the SWID2 in the second identification information storage unit is performed. Further when outputting the memory access request, each of the processors 210 and 220 not only outputs the VMID stored in the first identification information storage unit of each of the processors 210 and 220 but also outputs the SWID1 or the SWID2 stored in the second identification information storage unit of each of the processors 210 and 220 in association with the memory access request.

Figure 13:
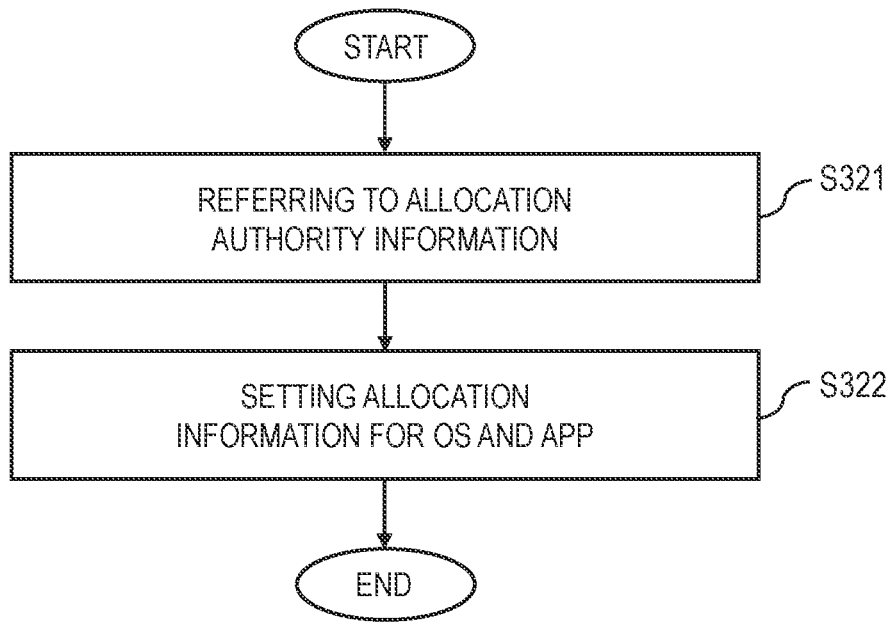
FIG. 13 is a flowchart showing an example of processing for setting allocation information by an OS according to the second embodiment.

Further, the OS operating on the VM sets allocation information based on allocation authority information. FIG. 13 is a flowchart showing an example of processing for setting allocation information by an OS according to the second embodiment. As shown in FIG. 13, the flowchart of FIG. 13 includes a step S321 and a step S322. The processing of the step S321 and the step S322 is performed in the processing of the step S320 in FIG. 11.

First, in the step S321, processing of referring to allocation authority information is performed. In the processing of the step S321, the OS operating on the VM confirms the range of at least one way allocated to the OS itself referring to the allocation authority information stored in the allocation authority information storage unit 231. For example, when the allocation authority information shown in FIG. 12 is stored in the allocation authority information storage unit 231, the OS1 operating on the VM1 confirms that the range of at least one way allocated to the OS1 itself is the ways 131 and 132 referring to the allocation authority information. In other words, the OS1 confirms that the hypervisor authorizes the OS1 to allocate the ways 131 and 132. Further, the OS2 operating on the VM2 confirms that the range of at least one way allocated to the OS2 itself is the ways 133 and 134 referring to the allocation authority information. In other words, the OS2 confirms that the hypervisor authorizes the OS2 to allocate the ways 133 and 134.

Next, in the step S322, processing of setting allocation information for an OS and an APP is performed. In the processing of the step S322, the OS operating on the VM sets, within the rage of at least one way allocated, allocation information so as to allocate at least one of the ways 131-134 which can be used by each of the OS itself and the APP operating on the OS itself.

FIG. 14 is a diagram showing an example of allocation information according to the second embodiment. As shown in FIG. 14, the OS operating on the VM sets, within the range of at least one way allocated to the OS itself, a correspondence relation between each of the OS itself and the APP operating on the OS itself and each of the ways 131-134 using a combination of the VMID1 and the SWID1 or the SWID2, and a combination of the VMID2 and the SWID1 or the SWID2.

Further, FIG. 14 corresponds to the case where the allocation authority shown in FIG. 12 is set. The "-" notation is used for an area that is not authorized to be allocated. The same notation is applied to the drawings other than FIG. 14. The OS operating on the VM includes the correspondence relation between each of the OS itself and the APP operating on the OS itself and each of the ways 131-134 in the allocation information and stores it in the allocation information storage unit 135.

The SWID1 is unique information associated with an OS executed by a VM. The SWID2 is unique information associated with an APP executed by a VM. The SWID1 and the SWID2 are generated by an OS.

In FIG. 14, since the OS1 operating on the VM1 is authorized by the hypervisor to allocate the OS1 within the range of the ways 131 and 132 (area A in FIG. 14), the combination of the and the SWID1 is associated with the way 132, and the VMID1 combination of the VMID1 and the SWID2 is associated with the way 131. The OS1 includes the correspondence relation between each of the OS1 and the APP1 and each of the ways 131 and 132 in the allocation information and stores it in the allocation information storage unit 135. As a result, the OS1 can use the way 132, and the APP1 operating on the OS1 can use the way 131.

On the other hand, since the OS2 operating on the VM2 is authorized by the hypervisor to allocate the OS2 within the range of the ways 133 and 134 (area B in FIG. 14), the combination of the VMID2 and the SWID1 is associated with the way 134, and the combination of the VMID2 and the SWID2 is associated with the way 133. The OS2 includes the correspondence relation between each of the OS2 and the APP2 and each of the ways 133 and 134 in the allocation information and stores it in the allocation information storage unit 135. As a result, the OS2 can use the way 134, and the APP2 operating on the OS2 can use the way 133.

The cache memory 230 may be provided with a function of not storing, in the allocation information storage unit 135, inappropriate allocation information set beyond the range of allocation authority. Further, the cache memory 230 may be provided with a function to ignore the improper allocation information even if the improper allocation information is stored in the allocation information storage unit 135.

Figure 15:
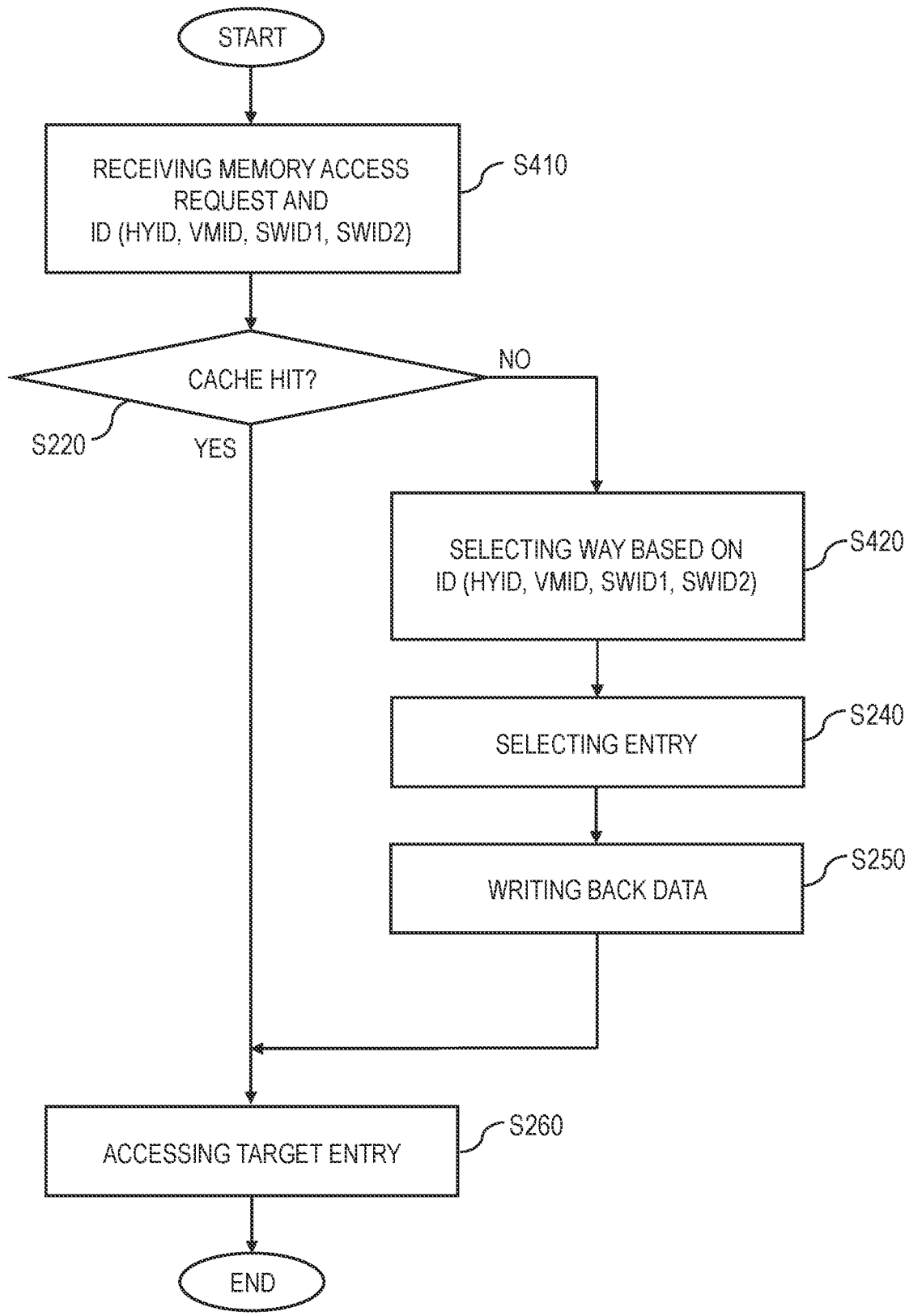
FIG. 15 is a flowchart showing an example of an operation of a cache memory according to the second embodiment.

Next, an operation of the cache memory 230 according to the second embodiment will be described. FIG. 15 is a flowchart showing an example of an operation of the cache memory 230 according to the second embodiment. As shown in FIG. 15, the flowchart of FIG. 15 includes processing of the step S220 and the steps S240-S260 shown in FIG. 6. Further, In FIG. 15, the step S210 of FIG. 6 is changed to a step S410, and the step S230 of FIG. 6 is changed to a step S420.

In the step S410, processing of receiving a memory access request and IDs (HYID, VMID, SWID1, SWID2) is performed. In the step S410, the cache memory 230 receives a memory access request from each of processors 210 and 220 via the bus 150.

Further, when outputting a memory access request while executing the hypervisor, each of the processors 210 and 220 outputs the HYID stored in the first identification information storage unit of each of the processors 210 and 220 to the cache memory 230 in association with the memory access request. The cache memory 230 receives the HYID associated with the memory access request from each of the processors 210 and 220 via the bus 150.

When outputting a memory access request while executing the OS or the APP, each of the processors 210 and 220 outputs the VMID stored in the first identification information storage unit of each of the processors 210 and 220 and the SWID1 or the SWID2 stored in the second identification information storage unit of each of the processors 210 and 220 to the cache memory 230 in association with the memory access request. The cache memory 230 receives the VMID, and the SWID1 or SWID2 associated with the memory access request from each of the processors 210 and 220 via the bus 150.

In the step S420, processing of selecting a way based on IDs (HYID, VMID, SWID1, SWID2) is performed. In the step S420, if the memory access request is not a cache hit, the cache memory 230 confirms the IDs (HYID, VMID, SWID1, SWID2) output in association with the memory access request from each of the processors 210 and 220 and refers to the allocation information stored in the allocation information storage unit 135.

When receiving the HYID associated with the memory access request, the cache memory 230 selects a way to be replaced data based on the HYID associated with the memory access request and the allocation information stored in the allocation information storage unit 135.

When receiving the VMID associated with the memory access request, the cache memory 230 selects a way to be replaced data based on the VMID and the SWID1 or SWID2 associated with the memory access request, and the allocation information stored in the allocation information storage unit 135.

Here, it is assumed that the allocation information stored in the allocation information storage unit 135 is the information shown in FIG. 14. When receiving the VMID1 and the SWID1 associated with the memory access request, the cache memory 230 recognizes that the memory access request is a memory access request output during the execution of the OS1. The cache memory 230 selects the way 132 as a way to be replaced data based on the VMID1, the SWID1 and the allocation information shown in FIG. 14.

Further, when receiving the VMID1 and the SWID2 associated with the memory access request, the cache memory 230 recognizes that the memory access request is a memory access request output during the execution of the APP1. The cache memory 230 selects the way 131 as a way to be replaced data based on the VMID1, the SWID2 and the allocation information shown in FIG. 14.

When receiving the VMID2 and the SWID1 associated with the memory access request, the cache memory 230 recognizes that the memory access request is a memory access request output during the execution of the OS2. The cache memory 230 selects the way 134 as a way to be replaced data based on the VMID2, the SWID1 and the allocation information shown in FIG. 14.

Further, when receiving the VMID2 and the SWID2 associated with the memory access request, the cache memory 230 recognizes that the memory access request is a memory access request output during the execution of the APP2. The cache memory 230 selects the way 133 as a way to be replaced data based on the VMID2, the SWID2 and the allocation information shown in FIG. 14.

As described above, the semiconductor device 200 according to the second embodiment can set an allocation of ways in units of software (OS and APP) executed by a VM. That is, the semiconductor device 200 according to the second embodiment can allocate ways that can be used by the OS and the APP even in the processing in the VM. If the way used by the OS and the way used by the APP are separated, for example, the data related to the APP1 stored in the way is not expelled by the processing of the OS1. In addition, the data related to the OS1 stored in the way is not expelled by the processing of the APP1.

As described above, according to the second embodiment, the hypervisor sets allocation authority information for granting an authority to allocate at least one of the plurality of ways to an OS executed by each of the plurality of VMs. The OS confirms the range of at least one way allocated to the OS itself referring to the allocation authority information, and sets, within the range of at least one way allocated, allocation information so as to allocate at least one of the plurality of ways which can be used by each of the OS itself and the APP operating on the OS itself. If a memory access request is not a cache hit, the cache memory selects a way to be replaced data based on a VMID1, an SWID1 or an SWID2, and the allocation information. As described above, in the semiconductor device according to the second embodiment, since the way is allocated to the software (OS and APP) executed by the VM, the semiconductor device 200 according to the second embodiment can set the granularity of the allocation more finely than the semiconductor device according to the first embodiment.

Further, in the semiconductor device according to the second embodiment, the hypervisor grants, to the OS operating on the VM, allocation authority for allocating the way used by the software (OS and APP) operating on the VM, and the OS to which the allocation authority is granted allocates the way used by the OS and the APP on behalf of the hypervisor. This facilitates implementation and also reduces the overhead of the context switch, compared to the case where the hypervisor performs all the work of allocating the ways.

Third Embodiment

Figure 16:
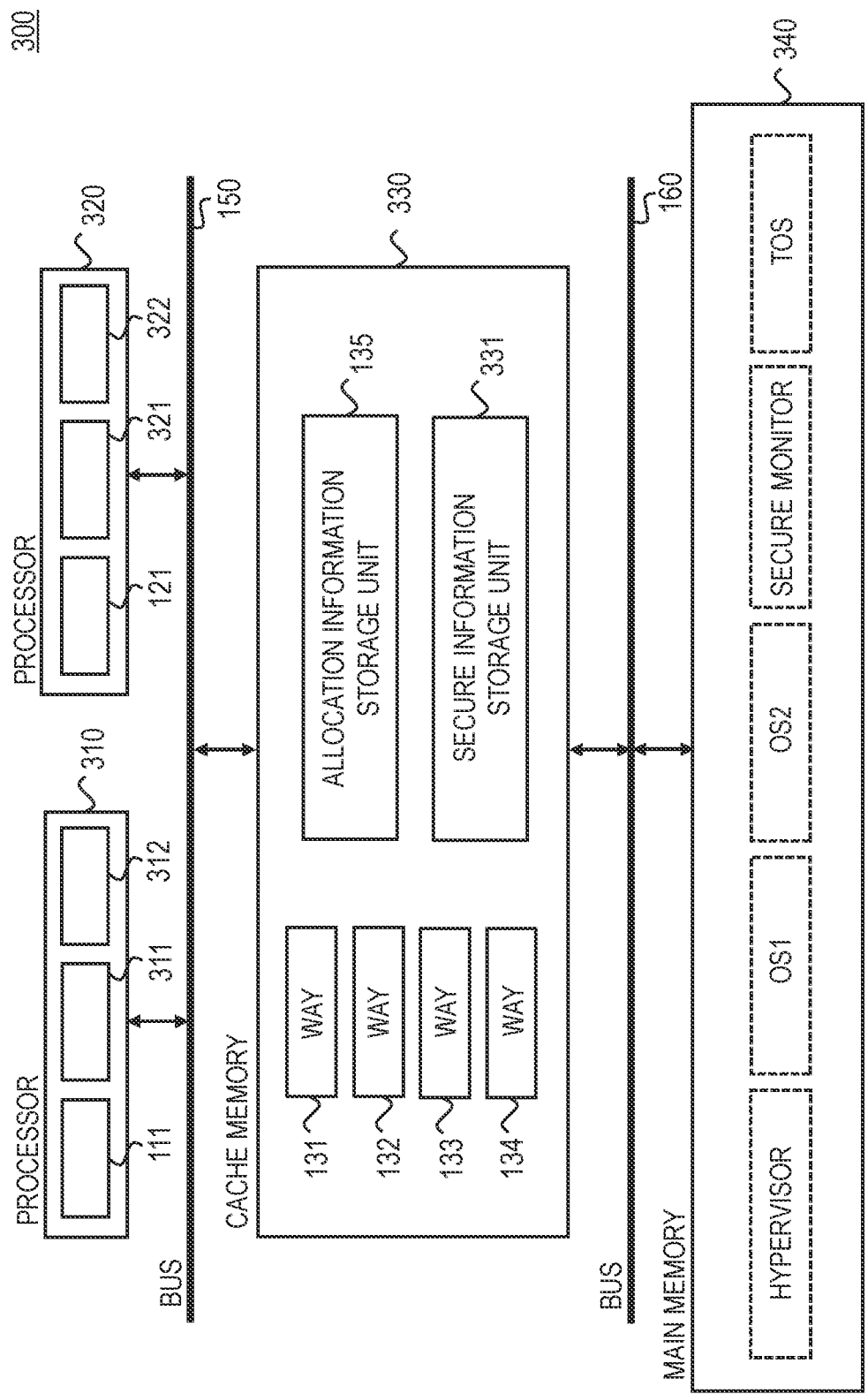
FIG. 16 is a block diagram showing an example of a configuration of a semiconductor device according to the third embodiment.

Next, a third embodiment will be described. A semiconductor device according to the third embodiment is different from the semiconductor device according to the first embodiment in that each of a plurality of processors operates by switching between a secure operation mode and a non-secure operation mode, FIG. 16 is a block diagram showing an example of a configuration of a semiconductor device 300 according to the third embodiment. As shown in FIG. 16, the processors 110 and 120, the cache memory 130, and the main memory 140 of FIG. 1 are changed to processors 310 320, a and cache memory 330, and a main memory 340, respectively.

Figure 17:
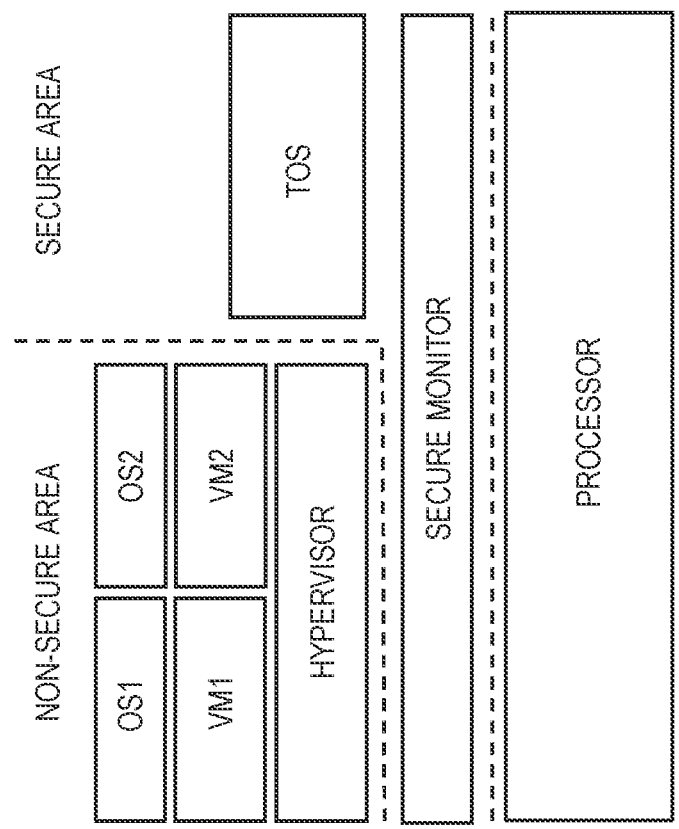
FIG. 17 is a schematic diagram for explaining a configuration of software according to the third embodiment.

In the semiconductor device 300 according to the third embodiment, a secure monitor operates. The secure monitor controls switching between a secure operation mode in which a trusted operating system (TOS) that does not operate on a hypervisor operates and a non-secure operation mode in which the hypervisor operates. FIG. 17 is a schematic diagram for explaining a configuration of software according to the third embodiment. As shown in FIG. 17, a secure monitor, which is security management software, is implemented on a processor. A TOS and a hypervisor are configured on the secure monitor. The configuration of the hypervisor side is the same as that of the first embodiment.

The secure monitor and the TOS are included in a secure area. The TOS is an OS with enhanced security. The operation mode of the processor on which the secure monitor and the TOS operate is the secure operation mode. Further, the hypervisor, the VM1, the VM2, the OS1, and the OS2 are included in a non-secure area. The operation mode of the processor on which the hypervisor, the VM1, the VM2, the OS1, and the OS2 operate is the non-secure operation mode. In this way, the TOS and the OS operating on the VM is executed in isolation by switching the operation mode of the processor.

In FIG. 16, the processor 310 includes, in addition to the first identification information storage unit 111, a third identification information storage unit 311 for storing identification information and an operation mode information storage unit 312 for storing operation mode information. When the processor 310 executes the secure monitor, secure monitor identification information (SMID) for identifying the secure monitor is stored in the third identification information storage unit 311. When the processor 310 executes the TOS, third software identification information (SWID3) for identifying the TOS is stored in the third identification information storage unit 311. When the processor 310 operates in a secure operation mode, operation mode information (S-MODE) indicating operation in the secure operation mode is stored in the operation mode information storage unit 312. When the processor 310 operates in a non-secure operation mode, operation mode information (NS-MODE) indicating operation in the non-secure operation mode is stored in the operation mode information storage unit 312.

The processor 320 includes, in addition to the first identification information storage unit 121, a third identification information storage 321 unit for storing identification information and an operation mode information storage unit 322 for storing operation mode information. When the processor 320 executes the secure monitor, an SMID is stored in the third identification information storage unit 321. When the processor 320 executes the TOS, an SWID3 is stored in the third identification information storage unit 321. When the processor 320 operates in a secure operation mode, an S-MODE is stored in the operation mode information storage unit 322. When the processor 320 operates in a non-secure operation mode, an NS-MODE is stored in the operation mode information storage unit 322.

When outputting a memory access request to the cache memory 330 via the bus 150 during operation in the secure operation mode, each of the processors 310 and 320 outputs the SMID or the SWID3 stored in the third identification information storage unit in association with the memory access request. The SMID or the SWID3 output in association with the memory access request is used as information for determining a way of the cache memory 330 to be replaced data when it is determined in the cache memory 330 that the memory access request is not a cache hit.

Further, when outputting a memory access request to the cache memory 330 via the bus 150 during operation in the non-secure operation mode, each of the processors 310 and 320 outputs the HYID or the VMID stored in the first identification information storage unit in association with the memory access request. The HYID or the VMID output in association with the memory access request is used as information for determining a way of the cache memory 330 to be replaced data when it is determined in the cache memory 330 that the memory access request is not a cache hit.

The cache memory 330 includes a secure information storage unit 331 in addition to the configuration of the cache memory 130 of FIG. 1. The secure information storage unit 331 stores secure information. The secure information is information for dividing the ways 131-134 into a way that can be used in the secure operation mode and a way that can be used in the non-secure operation Mode.

The main memory 340 stores data of the secure monitor and data of the TOS in addition to the data of the hypervisor, the data of the OS1 and the data of the OS2. The data of the secure monitor includes programs for the secure monitor and various data used by the secure monitor. The data of the TOS includes programs for the TOS and various data used by the TOS. When operating in the secure operation mode, the processors 310 and 320 read and execute the programs for the secure monitor and the programs for the TOS stored in the main memory 340.

Figure 18:
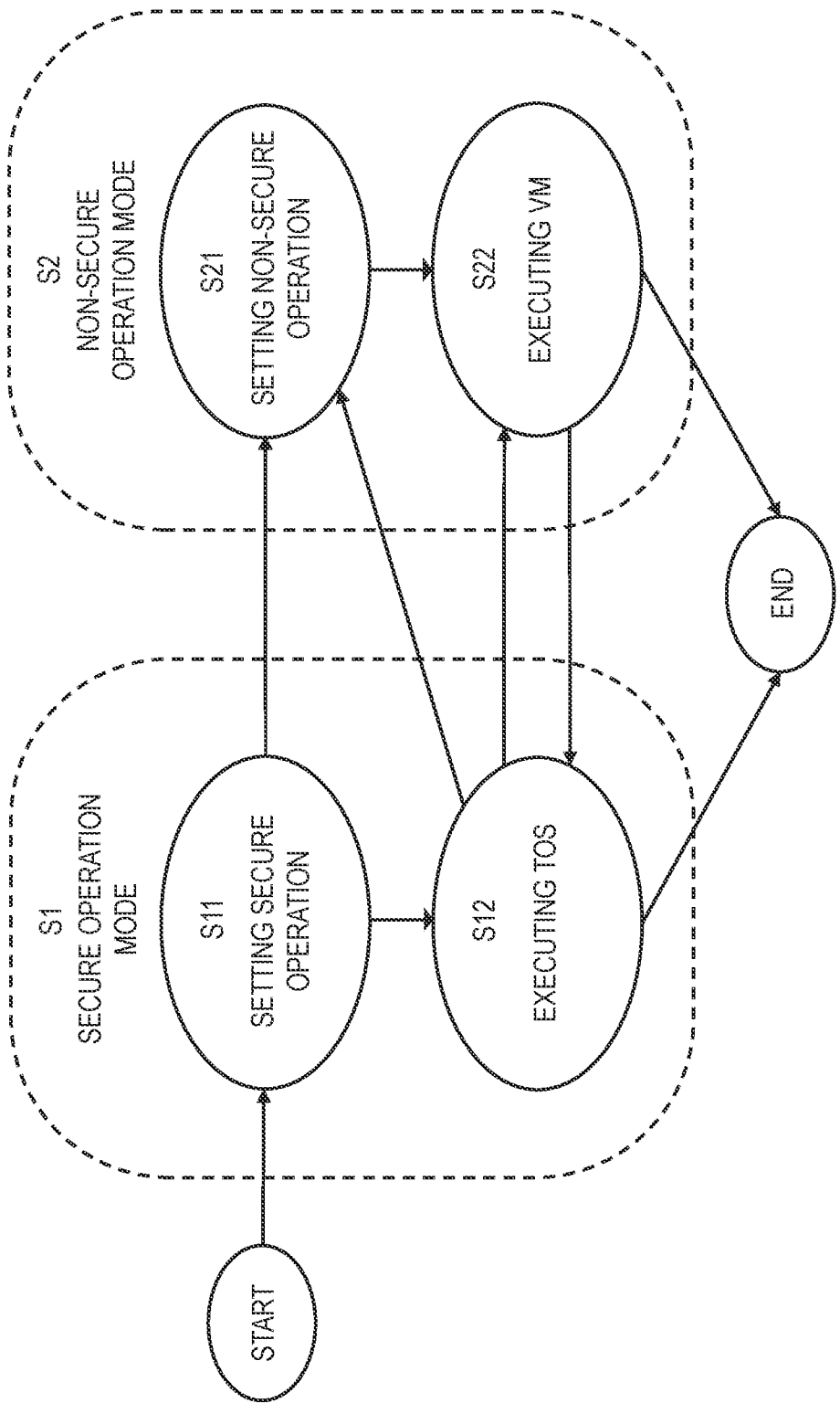
FIG. 18 is a state transition diagram for explaining an operation state of a processor according to the third embodiment.

Next, an operation of the semiconductor device 300 according to the third embodiment will be described. FIG. 18 is a state transition diagram for explaining an operation state of the processor according to the third embodiment. As shown in FIG. 18, the operation state of the processor includes a state S1 in which the processor operates in a secure operation mode and a state S2 in which the processor operates in non-secure a operation mode. Further, the state S1 includes a state S11 in which processing of setting a secure operation is performed and a state S12 in which processing of executing the TOS is performed. The state S2 includes a state S21 in which processing of setting non-secure operation is performed and a state S22 in which processing of executing VMs is performed.

In the state S11, the processor performs the processing of setting the secure operation. Upon completion of this processing, the processor can perform the processing of executing the TOS in the state S12. Further, in the state S21, the processor performs the processing of setting the non-secure operation. Upon completion of this processing, the processor can perform the processing of executing the VMs in the state S22.

Figure 19:
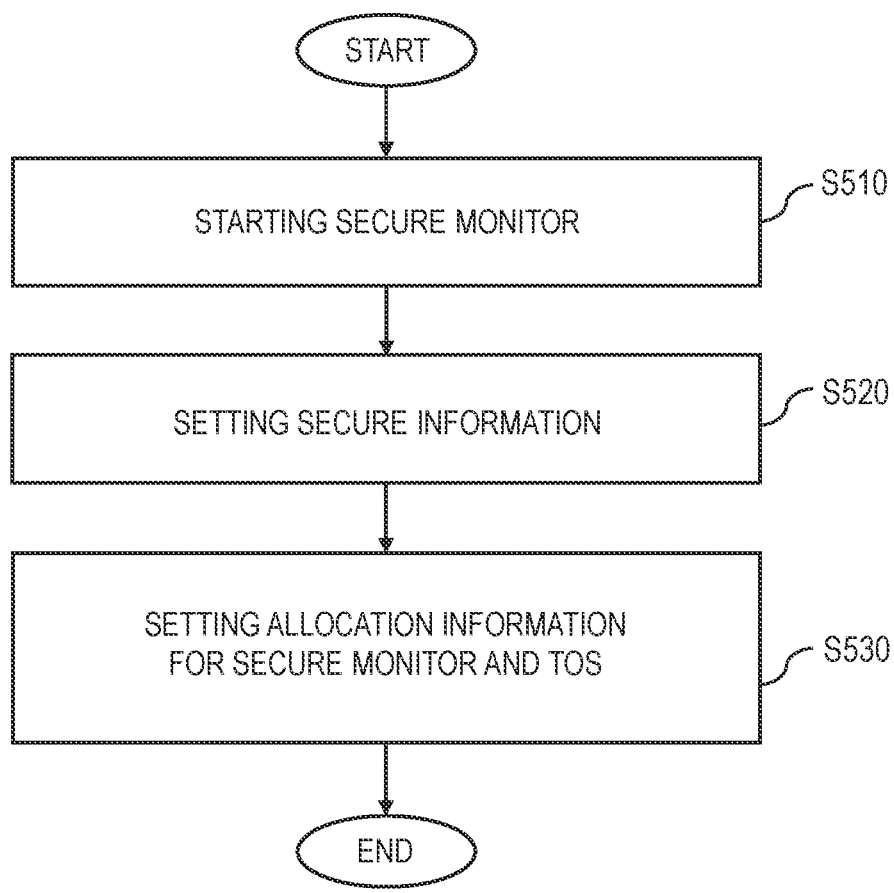
FIG. 19 is a flowchart showing an example of processing of setting a secure operation according to the third embodiment.

First, in the state S11, the processing of setting the secure operation is performed. FIG. 19 is a flowchart showing an example of processing of setting a secure operation according to the third embodiment. As shown in FIG. 19, the processing performed in the state S11 includes processing of steps S510-S530.

In the step S510, processing of starting the secure monitor is performed. In the step S510, at least one of the processors 310 and 320 reads and executes the programs for the secure monitor stored in the main memory 340. This activates the secure monitor.

Further, when each of the processors 310 and 320 executes the secure monitor, the secure monitor stores an SMID in the third identification storage unit of each of the processors 310 and 320 executing the secure monitor. That is, when the processor 310 executes the secure monitor, the secure monitor stores the SMID in the third identification information storage unit 311. When the processor 320 executes the secure monitor, the secure monitor stores the SMID in the third identification information storage unit 321.

Next, in the step S520, processing of setting secure information is performed. In the step S520, the secure monitor stores secure information in the secure information storage unit 331 for dividing the ways 131-134 into at least one way which can be used in the secure operation mode and at least one way which can be used in the non-secure operation mode.

FIG. 20 is a diagram showing an example of secure information according to the third embodiment. As shown in FIG. 20, the secure monitor sets a correspondence relation between each of the secure operation mode and the non-secure operation mode and each of the ways 131-134. In the example of FIG. 20, the secure operation mode is associated with the way 134, and the non-secure operation mode is associated with the ways 131-133. Thus, the way 134 is enabled when the processor operates in the secure operation mode, and the ways 131-133 are enabled when the processor operates in the non-secure operation mode.

Finally, in the step S530, processing of setting allocation information for the secure monitor and the TOS is performed. In the step S530, the secure monitor sets, within the range of at least one way which can be used in the secure operation mode, allocation information so as to allocate at least one of the ways 131-134 which can be used by each of the secure monitor and the TOS.

FIG. 21 is a diagram showing an example of allocation information according to the third embodiment. As shown in FIG. 21, the secure monitor sets, using the SMID and the SWID3, a correspondence relation between each of the secure monitors and the TOS and each of the ways 131-134 within the range of at least one way which can be used in the secure operation mode. The SMID is unique information associated with the secure monitor. The SWID3 is a type of the SWID and is unique information associated with the TOS. The secure monitor includes the correspondence relation between each of the secure monitor and the TOS and each of the ways 131-134 in the allocation information and stores it in the allocation information storage unit 135.

Further, FIG. 21 corresponds to the case where the secure information shown in FIG. 20 is set. The secure monitor associates the SWID3 with the way 134 within the range of the way 134 that can be used in the secure operation mode (area C in FIG. 20). As a result, the TOS can use the way 134 in the secure operation mode. In the example of FIG. 21, the SMID is not associated with the way 134, but the secure monitor may also associate the SMID with the way 134. In this case, the secure monitor can use the way 134 in the secure operation mode.

In the step S530, only the setting of the allocation information related to the secure operation mode is performed. That is, only the allocation information in the SMID and the SWID3 of FIG. 21 is set.

In FIG. 18, upon completion of the processing of setting the secure operation, the operation state of the processor transitions to either the state S12 of the secure operation mode or the state S21 of the non-secure operation mode. When the operation state of the processor transitions to the state S12, the processing of executing the TOS is performed.

In the processing of executing the TOS in the state S12, the TOS is activated by reading and executing the programs for the TOS stored in the main memory 340 by at least one of the processors S310 and 320. The activated TOS performs processing such as authentication and cryptography that require confidentiality.

Further, when each of the processors 310 and 320 executes the TOS, the secure monitor stores an SWID3 in the third identification information storage unit of each of the processors 310 and 320 executing the TOS. That is, when the processor 310 executes the TOS, the secure monitor stores the SWID3 in the third identification information storage unit 311. When the processor 320 executes the TOS, the secure monitor stores the SWID3 in the third identification information storage unit 321.

Figure 22:
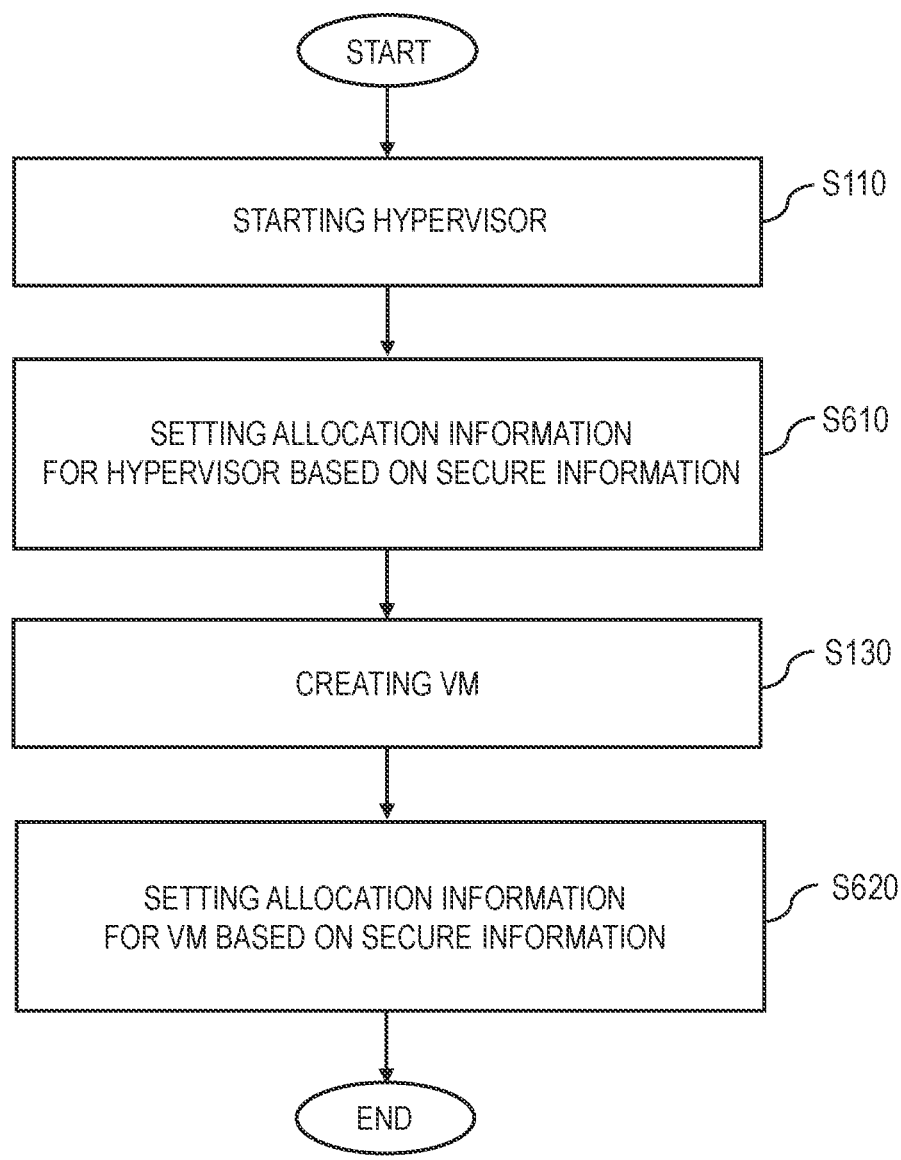
FIG. 22 is a flowchart showing an example of processing of setting a non-secure operation according to the third embodiment.

In FIG. 18, when the operation state of the processor transitions from the state S11 or the state S12 to the state S21, the processing of setting the non-secure operation is performed. FIG. 22 is a flowchart showing an example of the processing of setting non-secure operation according to the third embodiment. As shown in FIG. 22, the processing performed in the state S21 includes the processing of the step S110 and the step S130 shown in FIG. 3. Further, in FIG. 22, the step S120 of FIG. 3 is changed to a step S610, and the step S140 of FIG. 3 is changed to a step S620.

In the step S610, processing of setting allocation information for the hypervisor based on secure information is performed. In the processing of the step S610, the hypervisor confirms the range of at least one way that can be used in the non-secure operation mode referring to the secure information stored in the secure information storage unit 331. For example, when the secure information shown in FIG. 20 stored in the secure information storage unit 331, the hypervisor confirms that the range of at least one way which can be used in the non-secure operation mode is the ways 131-133 referring to the secure information.

Further, in the step S610, the hypervisor sets, within the range of at least one way which can be used in the non-secure operation mode, allocation information so as to allocate at least one of the ways 131-134 that can be used by the hypervisor. As shown in FIG. 21, the hypervisor sets, using the HYID, a correspondence relation between the hypervisor and each of the ways 131-134 within the range of at least one way which can be used in the non-secure mode of operation. The hypervisor includes the correspondence relation between the hypervisor and each of the ways 131-134 in the allocation information and stores it in the allocation information storage unit 135.

In the example of FIG. 21, the hypervisor associates the HYID with the way 131 within the range of the ways 131-133 which can be used in the non-secure operation mode (area D in FIG. 21). The hypervisor includes the correspondence relation between the hypervisor and the way 131 in the allocation information and stores it in the allocation information storage unit 135. As a result, the hypervisor can use the way 131 in the non-secure operation mode.

At the step S620, processing of setting allocation information for VMs based on secure information is performed. In the processing of the step S620, the hypervisor sets, within the range of at least one way which can be used in the non-secure operation mode, allocation information so as to allocate at least one of the ways 131-134 that can be used by each of the VM1 and the VM2. As described in the step S610, the hypervisor confirms the range of at least one way which can be used in the non-secure operation mode referring to the secure information stored in the secure information storage unit 331.

As shown in FIG. 21, the hypervisor sets, using the VMID1 and the VMID2, a correspondence relation between each of the VM1 and the VM2 and each of the ways 131-134 within the range of at least one way which can be used in the non-secure operation mode. The hypervisor includes the correspondence relation between each of the VM1 and the VM2 and each of the ways 131-134 in the allocation information and stores it in the allocation information storage unit 135.

In the example of FIG. 21, the hypervisor associates the VMID1 with the way 132 and the VMID2 with the way 133 within the range of the ways 131-133 that can be used in the non-secure operation mode (area D in FIG. 21). The hypervisor includes the correspondence relation between the VMID1 and the way 132 and the correspondence between the VMID2 and the way 133 in the allocation information and stores it in the allocation information storage unit 135. As a result, in the non-secure operation mode, the VM1 can use the way 132 and the VM2 can use the way 133.

In FIG. 18, upon completion of the processing of setting the non-secure operation, the operation state of the processor transitions to the state S22 of the non-secure operation mode. In the state S22, the processing of executing the VMs is performed. The processing of executing the VMs is the same as the processing of the step S150 of FIG. 3.

As described above, in the semiconductor device 300 according to the third embodiment, the operation state of the processor is switched between the state S1 in which the processor operates in the secure operation mode and the state S2 in which the processor operates in the non-secure operation mode. Switching between the secure operation mode and the non-secure operation mode is controlled by the secure monitor.

When transitioning from the state S12 of the secure operation mode to the state S22 of the non-secure operation mode, the TOS calls the secure monitor using a secure monitor call. In response to the secure monitor call from the TOS, the secure monitor activates the hypervisor and switches the operation mode of the processor from the secure operation mode to the non-secure operation mode.

On the other hand, when transitioning from the state S22 of the non-secure operation mode to the state S12 of the secure operation mode, the hypervisor or the OS calls the secure monitor using a secure monitor call. In response to the secure monitor call from the hypervisor or the OS, the secure monitor activates the TOS and switches the operation mode of the processor from the non-secure operation mode to the secure operation mode.

Further, when each of the processors 310 and 320 operates in the secure operation mode, the secure monitor stores an S-MODE in the operation mode information storage unit of each of the processors 310 and 320 operating in the secure operation mode. That is, when the processor 310 operates in the secure operation mode, the secure monitor stores the S-MODE in the operation mode information storage unit 312. When the processor 320 operates in the secure operation mode, the secure monitor stores the S-MODE in the operation mode information storage unit 322.

On the other hand, when each of the processors 310 and 320 operates in the non-secure operation mode, the secure monitor stores an NS-MODE in the operation mode information storage unit of each of the processors 310 and 320 operating in the non-secure operation mode. That is, when the processor 310 operates in the non-secure operation mode, the secure monitor stores the NS-MODE in the operation mode information storage unit 312. When the processor 320 operates in the non-secure operation mode, the secure monitor stores the NS-MODE in the operation mode information storage unit 322.

As described above, the secure monitor stores an S-MODE in the operation mode information storage unit when the operation state of the processor is the state S1 of the secure operation mode. Further, the secure monitor stores an NS-MODE in the operation mode information storage unit when the operation state of the processor is the state S2 of the non-secure operation mode. The secure monitor updates the operation mode information when switching the operation mode of the processor.

Figure 23:
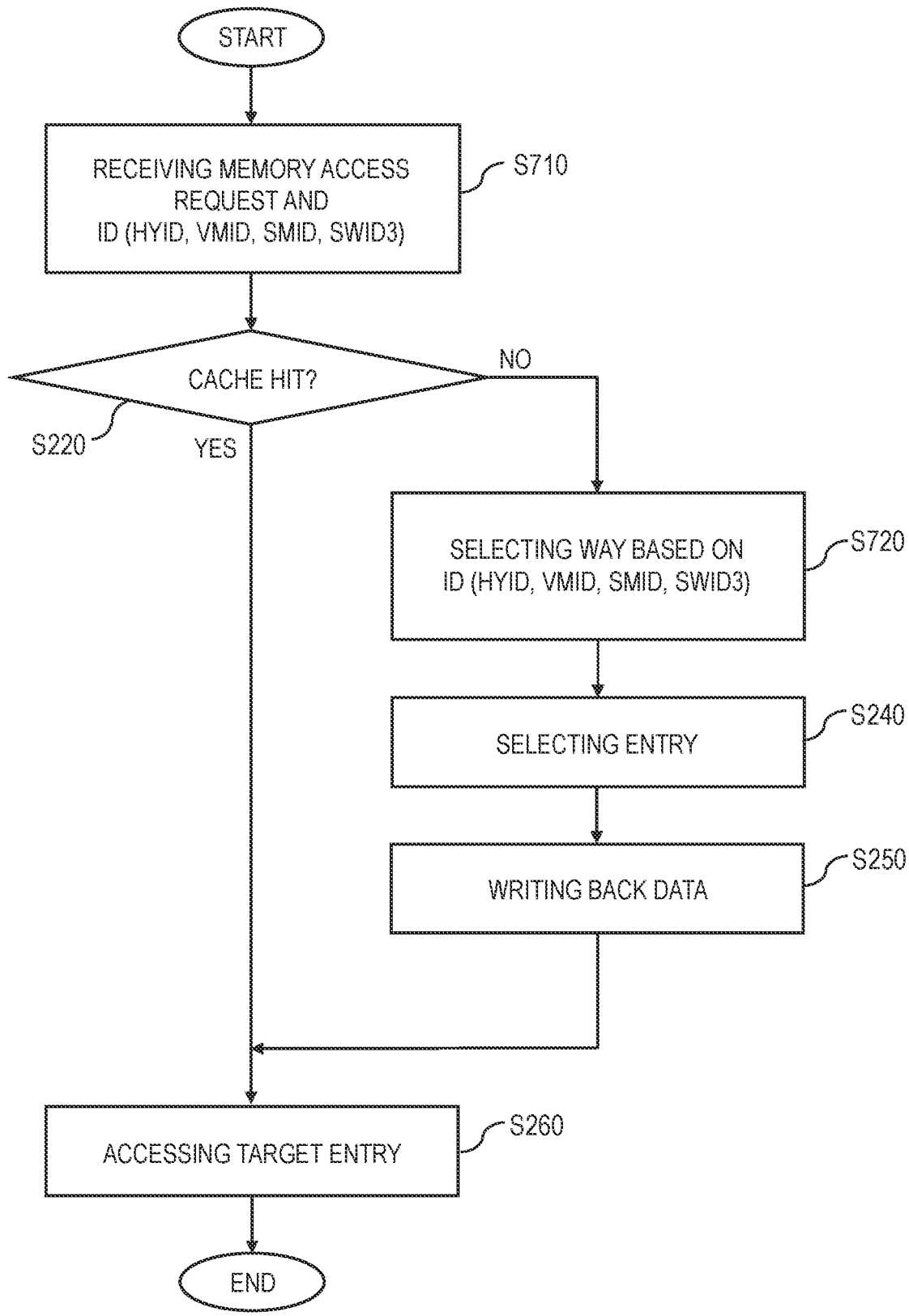
FIG. 23 is a flowchart showing an example of an operation of a cache memory according to the third embodiment.

Next, an operation of the cache memory 330 according to the third embodiment will be described. FIG. 23 is a flowchart showing an example of an operation of the cache memory 330 according to the third embodiment. As shown in FIG. 23, the flowchart of FIG. 23 includes the processing of the step S220 and the steps S240-S260 shown in FIG. 6. Further, in FIG. 23, the step S210 of FIG. 6 is changed to a step S710, and the step S230 of FIG. 6 is changed to a step S720.

In the step S710, processing of receiving a memory access request and IDs (HYID, VMID, SMID, SWID3) is performed. In the step S710, the cache memory 330 receives a memory access request from each of processors 310 and 320 via the bus 150.

Further, each of the processors 310 and 320 confirms the operation mode information stored in the operation mode information storage unit. When each of the processors 310 and 320 confirms that the S-MODE is stored in the operation mode information storage unit, each of the processors 310 and 320 recognizes that each of the processors 310 and 320 is operating in the secure operation mode. Further, when each of the processors 310 and 320 confirms that the NS-MODE is stored in the operation mode information storage unit, each of the processors 310 and 320 recognizes that each of the processors 310 and 320 is operating in the non-secure operation mode. Thus, each of the processors 310 and 320 recognize whether to be operating in either the secure operation mode or the non-secure operation mode by reading the operation mode information stored in the operation mode information storage unit of each of the processors 310 and 320.

When outputting a memory access request during operation in the secure operation mode, each of the processors 310 and 320 outputs the SMID or the SWID3 stored in the third identification information storage unit of each of the processors 310 and 320 to the cache memory 330 in association with the memory access request. The cache memory 330 receives the SMID or the SWID3 associated with the memory access request from each of processors 310 and 320 via the bus 150.

Further, when outputting a memory access request during operation in the non-secure operation mode, each of the processors 310 and 320 to the cache memory 330 in association with the memory access request. The cache memory 330 receives the HYID or the VMID associated with the memory access request from each of processors 310 and 320 via the bus 150.

In the step S720, processing of selecting a way based on IDs (HYID, VMID, SMID, SWID3) is performed. In step the S720, when the memory access request is not a cache hit, the cache memory 330 confirms the IDS (HYID, VMID, SMID, SWID3) output in association with the memory access request from each of the processors 310 and 320 and refers to the allocation information stored in the allocation information storage unit 135.

When receiving the SMID or the SWID3 associated with the memory access request, the cache memory 330 selects a way to be replaced data based on the SMID or the SWID3 associated with the memory access request and the allocation information stored in the allocation information storage unit 135.

Further, when receiving the HYID or the VMID associated with the memory access request, the cache memory 330 selects a way to be replaced data based on the HYID or the VMID associated with the memory access request and the allocation information stored in the allocation information storage unit 135.

Here, it is assumed that the allocation information stored in the allocation information storage unit 135 is the information shown in FIG. 21. When receiving the SMID associated with the memory access request, the cache memory 330 recognizes that the memory access request is a memory access request output during execution of the secure monitor. Referring to FIG. 21, the SMID is not associated with any of the ways 131-134. In this case, the memory access request is a memory access request in which the cache memory 330 is not used.

When receiving the SWID3 associated with the memory access request, the cache memory 330 recognizes that the memory access request is a memory access request output during execution of the TOS. The cache memory 330 selects the way 134 as a way to be replaced data based on the SWID3 and the allocation information shown in FIG. 21.

When receiving the HYID associated with the memory access request, the cache memory 330 recognizes that the memory access request is a memory access request output during the execution of the hypervisor. The cache memory 330 selects the way 131 as a way to be replaced data based on the HYID and the allocation information shown in FIG. 21.

When receiving the VMID1 associated with the memory access request, the cache memory 330 recognizes that the memory access request is a memory access request output during the execution of the VM1. The cache memory 330 selects the way 132 as a way to be replaced data based on the VMID1 and the allocation information shown in FIG. 21.

When receiving the VMID2 associated with the memory access request, the cache memory 330 recognizes that the memory access request is a memory access request output during the execution of the VM2. The cache memory 330 selects the way 133 as a way to be replaced data based on the VMID2 and the allocation information shown in FIG. 21.

As described above, the semiconductor device 300 according to the third embodiment allocates ways separately in the secure operation mode and the non-secure operation mode based on secure information set by the secure monitor. Therefore, the data of the VM (OS) stored in the way is not expelled by the processing of the TOS. Further, the data of the TOS stored in the way is not expelled by the processing of the VM (OS).

As described above, according to the third embodiment, the secure monitor sets secure information for dividing a plurality of ways into a way that can be used in the secure operation mode and a way that can be used in the non-secure operation mode. The secure monitor sets, the range of the ways which can be used in the secure operation mode, allocation information so as to allocate at least one way which can be used by the TOS. The hypervisor refers to the secure information and sets, within the range of the ways which can be used in the non-secure operation mode, the allocation information so as to allocate at least one way which can be used by the VM. When the memory access request is not a cache hit, the cache memory selects a way to be replaced data based on an SWID3 or a VMID and the allocation information. As described above, in the semiconductor device according to the third embodiment, the way can be appropriately allocated not only to the VM operating on the hypervisor but also to the TOS not operating on the hypervisor.

In the first to third embodiments, the semiconductor devices 100, 200, and 300 have been described as a configuration including two processors, but the present disclosure is not limited thereto. The number of processors may be multiple. Further, in the first to third embodiments, the cache memories 130, 230, and 330 have been described as a configuration including four ways, but the present disclosure is not limited thereto. The number of ways may be multiple.

Note that some or all of the first to third embodiments can be combined with each other. For example, in the semiconductor device 100 according to the first embodiment, as in the semiconductor device 200 according to the second embodiment, the way may be allocated to the OS and the APP operating on the OS. In this case, in the semiconductor device 100, the hypervisor allocates the way to the OS and the APP operating on the OS.

Although the invention made by the present inventor has been specifically described based on the embodiments, it is needless to say that the present invention is not limited to the above-described embodiments, and various changes may be made without departing from the scope thereof.

What is claimed is:

1. A semiconductor device in which a plurality of virtual machines managed by a hypervisor operates, comprising:

a plurality of processors which is configured to be capable of executing the plurality of virtual machines; and
a cache memory which includes a plurality of ways and an allocation information storage unit which is configured to store allocation information for setting allocation of the plurality of ways,
wherein each of the plurality of virtual machines is configured to execute a different operating system from each other,
wherein each of the plurality of processors includes a first identification information storage unit,
wherein the hypervisor is configured to:
set the allocation information so as to allocate at least one of the plurality of ways which can be used by each of the plurality of virtual machines; and
when each of the plurality of processors executes any of the plurality of virtual machines, store virtual machine identification information for identifying a virtual machine executed by each of the plurality of processors in the first identification information storage unit of each of the plurality of processors executing the virtual machine,
wherein, when outputting a memory access request, each of the plurality of processors is configured to output the virtual machine identification information stored in the first identification information storage unit of each of the plurality of processors in association with the memory access request, and
wherein, when the memory access request is not a cache hit, the cache memory is configured to select a way to be replaced data based on the virtual machine identification information associated with the memory access request and the allocation information stored in the allocation information storage unit.

2. The semiconductor device according to claim 1,
wherein the virtual machine identification information is unique information associated with each of the plurality of virtual machines,
wherein the hypervisor is configured to:
set a correspondence relation between each of the plurality of virtual machines and each of the plurality of ways using the virtual machine identification information; and
include the correspondence relation between each of the plurality of virtual machines and each of the plurality of ways in the allocation information.

3. The semiconductor device according to claim 1, wherein the hypervisor is configured to set the allocation information so as to allocate at least one of the plurality of ways which can be used by the hypervisor.

4. The semiconductor device according to claim 3, wherein, when each of the plurality of processors executes the hypervisor, the hypervisor is configured to store hypervisor identification information in the first identification information storage unit of each of the plurality of processors executing the hypervisor.

5. The semiconductor device according to claim 4,
wherein, when outputting the memory access request, each of the plurality of processors is configured to output the hypervisor identification information stored in the first identification information storage unit of each of the plurality of processors in association with the memory access request, and
wherein, when the memory access request is not a cache hit, the cache memory is configured to select a way to be replaced data based on the hypervisor identification information associated with the memory access request and the allocation information stored in the allocation information storage unit.

6. The semiconductor device according to claim 5,
wherein the hypervisor identification information is unique information associated with the hypervisor,
wherein the hypervisor is configured to:
set a correspondence relation between the hypervisor and each of the plurality of ways using the hypervisor identification information; and
include the correspondence relation between the hypervisor and each of the plurality of ways in the allocation information.

7. The semiconductor device according to claim 1,
wherein the cache memory is configured to:
determine whether the memory access request is a cache hit by comparing an address included in the memory access request with information stored in each of the plurality of ways;
when the memory access request is not a cache hit, select a way for storing data related to the memory access request from the plurality of ways based on the virtual machine identification information associated with the memory access request and the allocation information stored in the allocation information storage unit;
when the memory access request which is not the cache hit is a read request, read data related to the read request from a main memory and store the read data in the selected way; and
when the memory access request which is not the cache hit is a write request, store data related to the write request in the selected way.

8. The semiconductor device according to claim 1,
wherein the cache memory further includes an allocation authority information storage unit configured to store allocation authority information,
wherein each of the plurality of processors further includes a second identification information storage unit,
wherein the hypervisor is configured to store, in the allocation authority information storage unit, allocation authority information for granting an authority to allocate at least one of the plurality of ways to an operating system executed by each of the plurality of virtual machines;
wherein the operating system is configured to:
confirm a range of at least one way allocated to the operating system itself referring to the allocation authority information stored in the allocation authority information storage unit;
set, within the range of at least one way allocated, the allocation information so as to allocate at least one of the plurality of ways which can be used by each of the operating system itself and an application operating on the operating system itself; and
when each of the plurality of processors executes the operating system or the application, store a first software identification information for identifying the operating system or a second software identification information for identifying the application in the second identification information storage unit of each of the plurality of processors executing the operating system or the application,
wherein, when outputting a memory access request, each of the plurality of processors is configured to output the virtual machine identification information stored in the first identification information storage unit of each of the plurality of processors and the first or second software identification information stored in the second identification information storage unit of each of the plurality of processors in association with the memory access request, and wherein, when the memory access request is not a cache hit, the cache memory is configured to select a way to be replaced data based on the virtual machine identification information, the first or second software identification information associated with the memory access request, and the allocation information stored in the allocation information storage unit.

9. The semiconductor device according to claim 8,
wherein the virtual machine identification information is unique information associated with each of the plurality of virtual machines,
wherein the first software identification information is unique information associated with the operating system,
wherein the second software identification information is unique information associated with the application, and
wherein the operating system is configured to:
set, within the range of at least one way allocated, a correspondence relation between each of the operating system itself and the application operating on the operation system itself and each of the plurality of ways using a combination of the virtual machine identification information and the first or second software identification information; and
include the correspondence relation between each of the operating system itself and the application operating on the operation system itself and each of the plurality of ways in the allocation information.

10. The semiconductor device according to claim 1,
wherein the cache memory further includes a secure information storage unit,
wherein each of the plurality of processors further includes a third identification information storage unit, and is configured to be capable of operating by switching between a secure operation mode in which a trusted operating system operates and a non-secure operation mode in which the hypervisor operates, by a secure monitor,
wherein the secure monitor is configured to:
store, in the secure information storage unit, secure information for dividing the plurality of ways into at least one way which can be used in the secure operation mode and at least one way which can be used in the non-secure operation mode;
set, within a range of at least one way which can be used in the secure operation mode, the allocation information so as to allocate at least one of the plurality of ways which can be used in the trusted operating system; and
when each of the plurality of processors executes the trusted operating system, store a third software identification information for identifying the trusted operating system in the third identification information storage unit of each of the plurality of processors executing the trusted operating system,
wherein the hypervisor is configured to:
confirm a range of at least one way which can be used in the non-secure operation mode referring to the secure information stored in the secure information storage unit; and
set, within the range of at least one way which can be used in the non-secure operation mode, the allocation information so as to allocate at least one of the plurality of ways which can be used by each of the plurality of virtual machines; and
wherein each of the plurality of processors is configured to:
when outputting a memory access request during operation in the secure operation mode, output the third software identification information stored in the third identification information storage unit of each of the plurality of processors in association with the memory access request; and
when outputting a memory access request during operation in the non-secure operation mode, output the virtual machine identification information stored in the first identification information storage unit of each of the plurality of processors in association with the memory access request,
wherein, when the memory access request is not a cache hit, the cache memory is configured to:
select a way to be replaced data based on the third software identification information associated with the memory access request output during operation in the secure operation mode and the allocation information stored in the allocation information storage unit; and
select a way to be replaced data based on the virtual machine identification information associated with the memory access request output during operation in the non-secure operation mode and the allocation information stored in the allocation information storage unit.

11. The semiconductor device according to claim 10,
wherein each of the plurality of processors further includes an operation mode information storage unit,
wherein the secure monitor is configured to:
when the plurality of processors operates in the secure operation mode, store operation mode information indicating operation in the secure operation mode in the operation mode information storage unit of each of the plurality of processors operating in the secure operation mode; and
when the plurality of processors operates in the non-secure operation mode, store the operation mode information indicating operation in the non-secure operation mode in the operation mode information storage unit of each of the plurality of processors operating in the non-secure operation mode, and
wherein each of the plurality of processors is configured to recognize whether to be operating in either the secure operation mode or the non-secure operation mode by reading the operation mode information stored in the operation mode information storage unit of each of the plurality of processors.

12. The semiconductor device according to claim 10,
wherein the third software identification information is unique information associated with the trusted operation system, and
wherein the secure monitor is configured to:
set, within the range of at least one way which can be used in the secure operation mode, a correspondence relation between the trusted operating system and each of the plurality of ways using the third software identification information; and
include the correspondence relation between the trusted operating system and each of the plurality of ways in the allocation information.

13. The semiconductor device according to claim 10, wherein the secure monitor is configured to set, within the range of at least one way which can be used in the secure operation mode, the allocation information so as to allocate at least one of the plurality of ways which can be used by the secure monitor.

14. The semiconductor device according to claim 13, wherein, when each of the plurality of processors executes the secure monitor, the secure monitor is configured to store secure monitor identification information in the third identification information storage unit of each of the plurality of processors executing the secure monitor.

15. The semiconductor device according to claim 14,
wherein, when outputting the memory access request during operation in the secure operation mode, each of the plurality of processors is configured to output the secure monitor identification information stored in the third identification information storage unit of each of the plurality of processors in association with the memory access request, and
wherein, when the memory access request is not a cache hit, the cache memory is configured to select a way to be replaced data based on the secure monitor identification information associated with the memory access request and the allocation information stored in the allocation information storage unit.

16. The semiconductor device according to claim 1, wherein the hypervisor is configured to set the allocation information so that at least one of the plurality of ways is shared by at least two of the plurality of virtual machines.

17. The semiconductor device according to claim 1,
wherein the cache memory further a hit rate calculation circuit,
wherein the hit rate calculation circuit is configured to:
count, based on the virtual machine identification information associated with the memory access request, a number of memory access requests determined to be cache hits for each virtual machine; and
calculate, based on a counted result, a cache hit rate for each virtual machine, and
wherein the hypervisor is configured to:
calculate a difference between the cache hit rates of the virtual machines; and
when the difference between the cache hit rates is larger than a predetermined value, modify the allocation information so as to increase a number of ways which can be used by the virtual machine with a lower cache hit rate, or modify the allocation information so as to decrease the number of ways which can be used by the virtual machine with a higher cache hit rate.

18. A control method for a semiconductor device which includes a plurality of processors respectively including first identification information storage units, and a cache memory a plurality of ways and an allocation information storage unit, and in which a plurality of virtual machine managed by a hypervisor operates, the control method comprising:
a first step of causing the hypervisor to:
generating the plurality of virtual machines;
store, in the allocation information storage unit, allocation information to allocate at least one of the plurality of ways which can be used by each of the plurality of virtual machines; and
when each of the plurality of processors executes any of the plurality of virtual machines, store virtual machine identification information for identifying a virtual machine executed by each of the plurality of processors in the first identification information storage unit of each of the plurality of processors executing the virtual machine,
a second step of causing each of the plurality of virtual machines to execute a different operating system from each other;
a third step of causing each of the plurality of processors to:
output a memory access request; and
output the virtual machine identification information stored in the first identification information storage unit of each of the plurality of processors in association with the memory access request, and
a fourth step of causing the cache memory to select a way to be replaced data based on the virtual machine identification information associated with the memory access request and the allocation information stored in the allocation information storage unit, when the memory access request is not a cache hit.

19. The control method according to claim 18,
wherein the virtual machine identification information is unique information associated with each of the plurality of virtual machines, and
wherein the first step includes causing the hypervisor to:
set a correspondence relation between each of the plurality of virtual machines and each of the plurality of ways using the virtual machine identification information; and
include the correspondence relation between each of the plurality of virtual machines and each of the plurality of ways in the allocation information.

20. The control method according to claim 18, wherein the fourth step includes causing the cache memory to:
determine whether the memory access request is a cache hit by comparing an address included in the memory access request with information stored in each of the plurality of ways;
when the memory access request is not a cache hit, select a way for storing data related to the memory access request from the plurality of ways based on the virtual machine identification information associated with the memory access request and the allocation information stored in the allocation information storage unit;
when the memory access request which is not the cache hit is a read request, read data related to the read request from a main memory and store the read data in the selected way; and
when the memory access request which is not the cache hit is a write request, store data related to the write request in the selected way.

* * * * *